United States Patent
Sha et al.

(10) Patent No.: US 11,051,329 B2
(45) Date of Patent: Jun. 29, 2021

(54) SEARCH SPACE MONITORING

(71) Applicant: ZTE Corporation, Guangdong (CN)

(72) Inventors: Xiubin Sha, Guangdong (CN); Bo Dai, Guangdong (CN); Ting Lu, Guangdong (CN); Xu Liu, Guangdong (CN)

(73) Assignee: ZTE Corporation

( * ) Notice: Subject to any disclaimer, the term of this patent is extended or adjusted under 35 U.S.C. 154(b) by 0 days.

(21) Appl. No.: 16/786,996

(22) Filed: Feb. 10, 2020

(65) Prior Publication Data
US 2020/0178291 A1   Jun. 4, 2020

Related U.S. Application Data

(63) Continuation of application No. PCT/CN2017/097083, filed on Aug. 11, 2017.

(51) Int. Cl.
*H04W 72/12* (2009.01)
*H04L 1/08* (2006.01)
*H04L 1/18* (2006.01)
*H04W 72/04* (2009.01)

(52) U.S. Cl.
CPC ........... *H04W 72/1289* (2013.01); *H04L 1/08* (2013.01); *H04L 1/1812* (2013.01); *H04W 72/044* (2013.01)

(58) Field of Classification Search
CPC ........... H04W 72/1289; H04W 72/044; H04W 52/0229; H04W 52/0216; H04L 1/08; H04L 1/1812; Y02D 30/70
See application file for complete search history.

(56) References Cited

U.S. PATENT DOCUMENTS

| | | | | |
|---|---|---|---|---|
| 2018/0092122 | A1* | 3/2018 | Babaei | H04W 72/14 |
| 2018/0368174 | A1* | 12/2018 | Jeon | H04W 72/0446 |
| 2019/0335397 | A1* | 10/2019 | Ganesan | H04W 68/02 |
| 2019/0363857 | A1* | 11/2019 | Hwang | H04L 27/361 |
| 2020/0045706 | A1* | 2/2020 | Shin | H04L 1/1812 |

FOREIGN PATENT DOCUMENTS

| | | |
|---|---|---|
| CN | 102612119 A | 7/2012 |
| CN | 103108384 A | 5/2013 |
| CN | 103889039 A | 6/2014 |

OTHER PUBLICATIONS

3GPP TSG-RAN WG2 #97bis; R2-1702873; Source: InterDigital Communications;Title:Uplink HARQ Operation for NR ; Spokane, USA, Apr. 3-7, 2017. (Year: 2017).*

(Continued)

*Primary Examiner* — Hassan A Phillips
*Assistant Examiner* — Mohammed S Chowdhury
(74) *Attorney, Agent, or Firm* — Perkins Coie LLP

(57) ABSTRACT

One or more devices, systems, and/or methods for monitoring a search space are provided. For example, a node may operate in a first state. A configuration corresponding to a second state may be determined, based upon the first state. A search space may be monitored based upon the configuration. In another example, a second configuration corresponding to a semi-persistent scheduling (SPS) resource may be determined based upon a message. A second search space may be monitored based upon the second configuration.

20 Claims, 24 Drawing Sheets

(56) References Cited

OTHER PUBLICATIONS

3GPP TSG-RAN WG2 #97bis; R2-1702666; Source: Ericsson; Title: HARQ handling for SPS UL; Spokane, USA, Apr. 3-7, 2017 (Year: 2017).*
3GPP TSG-RAN WG2 Meeting #NR AH2; R2-1706417; Source:CATT; Title: Grant-free transmission and SPS; Qingdao, China, Jun. 27-29, 2017 (Year: 2017).*
3GPP TSG-RAN WG2#NR AdHoc#2;R2-1706687; Source: InterDigital; Title: SPS and Grant-free operation for NR; Qingdao, China , Jun. 27-29, 2017 (Year: 2017).*
Chinese Office Action for Application No. 2017800938771, dated Nov. 13, 2020, 24 pages (with translation).
International Search Report and Written Opinion dated May 9, 2018 for International Application No. PCT/CN2017/097083, filed on Aug. 11, 2017 (7 pages).
Nokia, et al., "Considerations on NR IDLE and RRC_INACTIVE," 3GPP TSG-RAN WG2 Meeting #96, Reno, Nevada, USA, R2-167709, 7 pages, Nov. 2016.

* cited by examiner

1700

| HARQ Process ID Number | ACK/NACK subcarrier | $k_0$ |
|---|---|---|
| 0 | 0 | 13 |
| 1 | 1 | 13 |
| 2 | 2 | 13 |
| 3 | 3 | 13 |
| 4 | 0 | 15 |
| 5 | 1 | 15 |
| 6 | 2 | 15 |
| 7 | 3 | 15 |
| 8 | 0 | 17 |
| 9 | 1 | 17 |
| 10 | 2 | 17 |
| 11 | 3 | 17 |
| 12 | 0 | 18 |
| 13 | 1 | 18 |
| 14 | 2 | 18 |
| 15 | 3 | 18 |

FIG. 17

SEARCH SPACE MONITORING

CROSS REFERENCE TO RELATED APPLICATIONS

This patent document is a continuation of and claims priority to International Patent Application No. PCT/CN2017/097083, filed on Aug. 11, 2017. The entire content of the before-mentioned patent application is incorporated by reference as part of the disclosure of this application.

BACKGROUND

A communication link between nodes, such as between a user equipment (UE) and a base station (BS), may be facilitated by monitoring a search space. For example, the UE may receive data from the BS at a time. The UE may monitor the search space at the time. However, the UE may have limited and/or changing power resources and/or may use methods to save energy while monitoring the search space.

SUMMARY

In accordance with the present disclosure, one or more devices and/or methods for monitoring a search space are provided. In an example, a first search space may be monitored in a first state. A configuration, corresponding to a second state, may be determined based upon the first state. The second state may be entered responsive to a completion of data transmission. A second search space may be monitored based upon the configuration.

In an example, a message may be received from a node. A configuration may be determined based upon the message. A semi-persistent scheduling (SPS) resource may be activated based upon the configuration. A search space may be monitored based upon the configuration.

In an example, a configuration corresponding to state may be determined. A message, comprising a monitoring instruction corresponding to a search space, may be generated based upon the configuration. The message may be transmitted to a node.

In an example, a configuration corresponding to an SPS resource may be determined. A message, comprising an activation instruction corresponding to the SPS resource, may be generated based upon the configuration. The message may be transmitted to a node.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 17 is a chart illustrating an example of one or more downlink SPS resources.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

One or more computing devices and/or techniques for monitoring a search space are provided. The search space may comprise one or more (e.g., locations of) physical downlink control channels (PDCCH). For example, a user equipment (UE) may connect to a (e.g., wireless communication) network via a base station (BS) of the network. The UE may receive data from the BS (e.g., and/or the network) at a specific time. In order to detect and/or successfully receive the data (e.g., from the BS) the UE may monitor the search space at the specific time. The monitoring the search space may result in high levels of energy consumption. However, the UE may have a limited energy (e.g., and/or power) supply. Thus, in accordance with one or more techniques herein, the monitoring the search space may be facilitated in a manner that allows the UE to monitor the search space for a monitoring time length and/or cease monitoring the search space for a time length corresponding to a monitoring interval, wherein the monitoring time length and/or the monitoring interval may be adjusted based upon data transmission demands, which may result in a reduction in the usage of energy (e.g., and/or power).

Figure 1A:
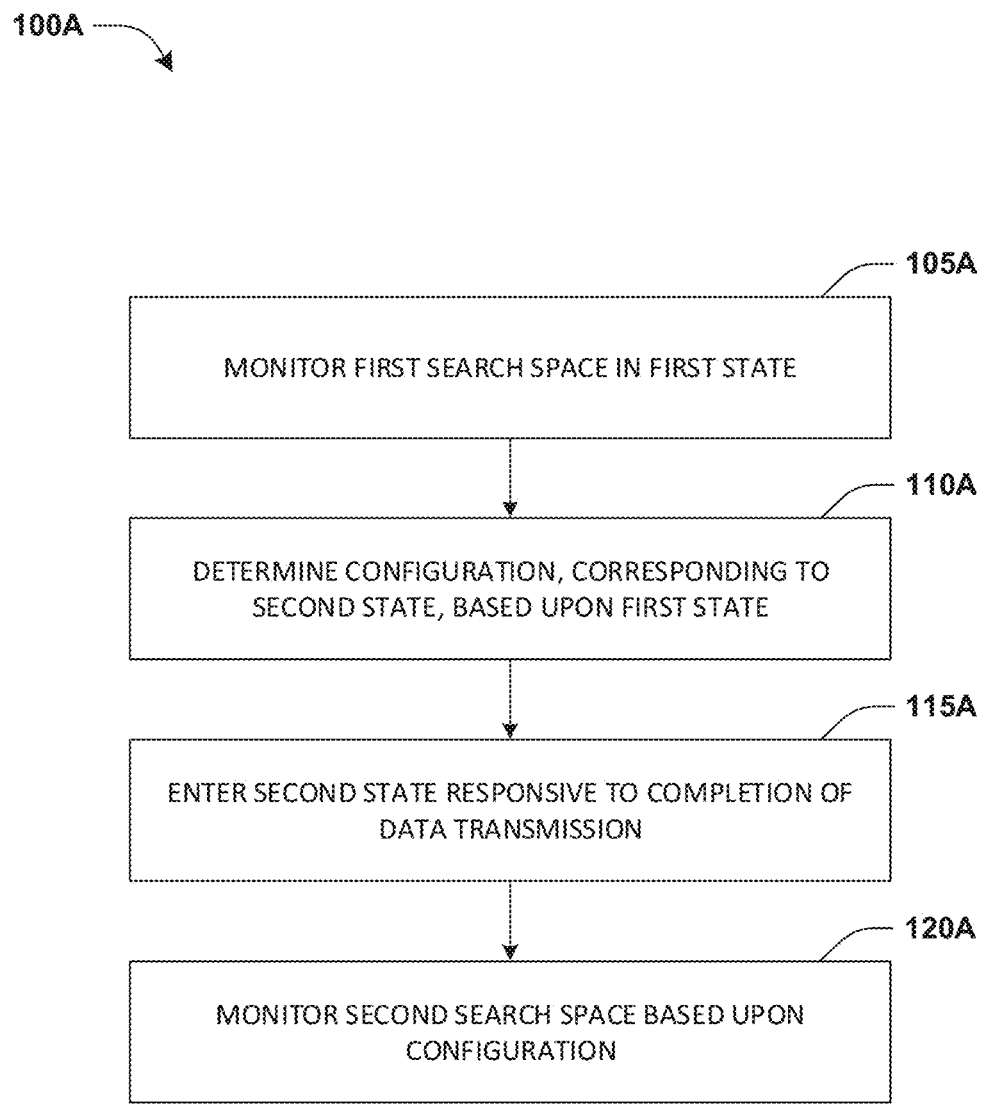
FIG. 1A is a flow chart illustrating an example method for switching from a first state to a second state.

An example method 100A of switching from a first state to a second state is illustrated in FIG. 1A. In some examples, a first node may operate in the first state. The first node may comprise a UE. At 105A, the first node may monitor a first search space in the first state. The first search space may comprise one or more PDCCHs. Alternatively and/or additionally, the first search space may comprise a user equipment specific search space (USS) and/or a common search space (CSS). The second state may be implemented with a second RRC state. Alternatively and/or additionally, the second state may be implemented with a second search space.

The first node may monitor the first search space (e.g., discontinuously) at a first time and/or a second time. At the first time, the first node may monitor the first search space for a first time length corresponding to a first number of subframes. The first node may (e.g., then) cease monitoring the first search space until the second time. At the second time, the first node may monitor the first search space for a second time length corresponding to a second number of subframes. The first number of subframes (e.g., and/or the first time length) may be equal to the second number of subframes (e.g., and/or the second time length).

The first state may have a first configuration indicative of a first time interval and/or a first number of repetitions. The first time interval may be based upon a time length between the first time and the second time. The first number of repetitions may be based upon the first number of subframes and/or the second number of subframes.

At 110A, the first node may determine a second configuration, corresponding to a second state, based upon the first state. The second state may comprise an energy saving state. Alternatively and/or additionally, the first node may not detect (e.g., monitor for, identify, receive) various (e.g., types of) information (e.g., channel state information (CSI) report, sounding reference signal (SRS), channel quality indicator, etc.) in (e.g., during) the second state. The second configuration may be indicative of a start time, a second time interval and/or a second number of repetitions.

In some examples, the start time may be based upon the first state. For example, the start time may be based upon a time when the first node leaves the first state. Alternatively and/or additionally, the start time of the second state may be based upon a time when the first node enters the second state. The first node may monitor a second search space at the start time and/or a third time. The second search space may be based upon the first search space. At the start time, the first node may monitor the second search space for a third time length corresponding to a third number of subframes. The first node may (e.g., then) cease monitoring the second search space until the third time. At the third time, the first node may monitor the second search space for a fourth time length corresponding to a fourth number of subframes. The third number of subframes (e.g., and/or the third time length) may be equal to the fourth number of subframes (e.g., and/or the fourth time length). In some examples, the third time may be determined based upon the start time and/or the second time interval. The second time interval may correspond to a time length between the start time and the third time. The second number of repetitions may be indicative of the third number of subframes and/or the fourth number of subframes.

In some examples, the first node may receive a message from a second node (e.g., network and/or BS). The second configuration may be determined based upon the message. In some examples, the message may comprise a medium access control (MAC) control element (CE) message. Alternatively and/or additionally, the message may comprise a radio resource control (RRC) message. Alternatively and/or additionally, the message may comprise a system information block (SIB).

Alternatively and/or additionally, the second configuration may be determined based upon an application of a rule to the first configuration. The rule may comprise a (e.g., standard) pre-defined rule. Alternatively and/or additionally, the first node may receive a message, from the second node, comprising the rule. In some examples, the message may comprise a MAC CE message. Alternatively and/or additionally, the message may comprise an RRC message. Alternatively and/or additionally, the message may comprise an SIB.

In some examples, the second time interval may be based upon the first time interval. For example, the second time interval may be equal to the first time interval. Alternatively and/or additionally, the second time interval may be larger than the first time interval. Alternatively and/or additionally, the second time interval may be smaller than the first time interval. The second time interval may be based upon a combination (e.g., multiplication, division, addition, subtraction, etc.) of a number and the first time interval.

In some examples, the second number of repetitions may be based upon the first number of repetitions. For example, the second number of repetitions may be equal to the first number of repetitions. Alternatively and/or additionally, the second number of repetitions may be larger than the first number of repetitions. Alternatively and/or additionally, the second number of repetitions interval may be smaller than the first number of repetitions. The second number of repetitions may be based upon a combination (e.g., multiplication, division, addition, subtraction, etc.) of a number and the first number of repetitions.

In some examples, the second configuration may be based upon capability information corresponding to the first node. The capability information may comprise communication capabilities of the first node in the second state (e.g., related to communication between the first node and the second node, in the second state). In some examples, the first node may receive a request message (e.g., requesting the capability information) (e.g., an RRC connection request message, an RRC connection resume request message, an RRC re-establishment request message, a MAC CE message, etc.) (e.g., from the second node). In some examples, the first node may transmit a capability information message (e.g., a non-orthogonal multiple access (NOMA) support capability indication, a second state related parameter support capability indication, a second state support capability indication, etc.,) comprising the capability information to the second node (e.g., and/or to an eNodeB). In some examples, the capability information message may comprise a MAC CE message. Alternatively and/or additionally, the capability information message may comprise an RRC message.

In some examples, the second configuration may be based upon one or more system parameters. The one or more system parameters may comprise one or more service types and/or one or more service characteristics. In some examples, the one or more service types may comprise continuity of data transmission and/or a size of data. In some examples, the one or more service characteristics may comprise a quality of service (QoS), a size of a transfer block, a cycle of service and/or a periodicity. In some examples, the first node may receive a request message (e.g., from the second node). In some examples, the first node may transmit a system parameter message comprising the one or more system parameters to the second node (e.g., and/or to an eNodeB). In some examples, the first node may transmit the system parameter message using UE-specific signaling and/or a Uu interface. In some examples, the system parameter message may comprise a MAC CE message. Alternatively and/or additionally, the system parameter message may comprise an RRC message.

In some examples, the first node may perform data transmission with the second node. The data transmission may comprise transmitting data to the second node and/or receiving data from the second node. At 115A, the first node may enter the second state responsive to a completion of the data transmission. In some examples, the completion of the data transmission may correspond to a time when data has been (e.g., completely) transmitted to the second node and/or (e.g., completely) received from the second node.

In some examples, the first node (e.g., and/or the second node) may start a timer responsive to the completion of the data transmission. The first node may enter the second state responsive to a timeout of the timer. The timer may timeout responsive to the first node performing no data transmission for a specified time length.

In some examples, at 120A, the first node may monitor the second search space based upon the configuration. The first node may monitor the second search space at the start time for a monitoring time length corresponding to the second number of repetitions. The first node may (e.g., then) cease monitoring the second search space. The first node may (e.g., then) (e.g., begin to) monitor the second search space at the third time. In some examples, the first node may receive a message at a time. In some examples, the message may be received by the first node using a PDCCH resource. In some examples, the message may be formatted with a downlink control information (DCI) format. Alternatively and/or additionally, the message may comprise an RRC message. Alternatively and/or additionally, the message may comprise a MAC CE message. Alternatively and/or additionally, the message may comprise an SIB. In some examples, the first node may monitor the search space at the time. The first node may (e.g., then) enter a third state based upon the message. In some examples, the first node may transmit information at the time. The first node may (e.g., then) enter the third state based upon (e.g., transmission of) the information.

In some examples, the first node may activate a NOMA resource. In some examples, the second configuration may be based upon the NOMA resource. For example, the start time may be based upon the NOMA resource. Alternatively and/or additionally, the second number of repetitions may be based upon the NOMA resource. Alternatively and/or additionally, the second time interval may be based upon the NOMA resource. In some examples, the second search space may be based upon the NOMA resource. In some examples, the first node may receive a message at a time. In some examples, the first node may monitor the second search space at the time. Alternatively and/or additionally the first node may not monitor the second search space at the time. The first node may (e.g., then) deactivate the NOMA resource based upon the message. In some examples, the time is equal to the third time. Alternatively and/or additionally, the time is before the third time. Alternatively and/or additionally, the time is after the third time. In some examples, the first node may transmit information at the time. The first node may (e.g., then) deactivate the NOMA resource based upon (e.g., transmission of) the information.

The second search space may comprise one or more PDCCHs. Alternatively and/or additionally, the second search space may comprise a USS and/or a CSS.

Figure 1B:
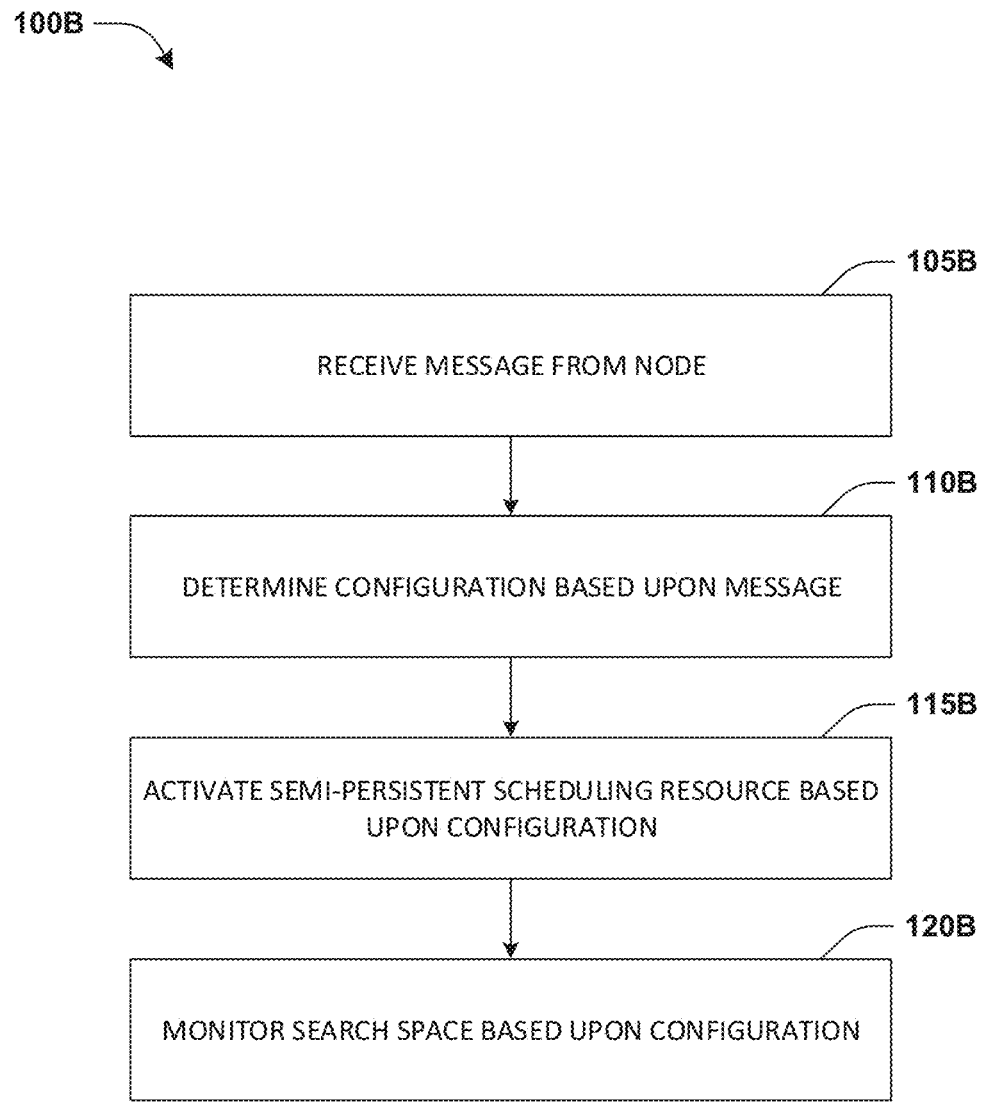
FIG. 1B is a flow chart illustrating an example method for using a semi-persistent scheduling (SPS) resource.

An example method 100B of using a semi-persistent scheduling (SPS) resource is illustrated in FIG. 1B. In some examples, a first node may operate in a first state. The first node may comprise a UE. At 105B, the first node may receive a message from a second node (e.g., network and/or BS). In some examples, the message may be received by the first node using a PDCCH resource. In some examples, the message may be formatted with a DCI format. Alternatively and/or additionally, the message may comprise an RRC message. Alternatively and/or additionally, the message may comprise a MAC CE message. Alternatively and/or additionally, the message may comprise an SIB.

At 110B, the first node may determine a configuration based upon the message. In some examples, the configuration may correspond to the SPS resource and/or to a hybrid automatic repeat request (HARM) resource process. The configuration may be indicative of a search space, a start time, a number of repetitions and/or a first time interval.

The first node may monitor the search space at the start time and/or a second time. The search space may be based upon the SPS resource. At the start time, the first node may monitor the search space for a first time length corresponding to the number of repetitions. The first node may (e.g., then) cease monitoring the search space until the second time. At the second time, the first node may monitor the search space for the first time length. The first node may determine the second time based upon the start time and the time interval. In some examples, the time interval may correspond to a time length between the start time and the second time.

In some examples, the configuration may be indicative of a third time corresponding to a first resource block, a fourth time corresponding to a second resource block and/or a second time interval. In some examples, the third time may be based upon an application of a rule to the start time. For example, the third time may be based upon a combination (e.g., multiplication, division, addition, subtraction, etc.) of a number and the start time. In some examples, the fourth time may be based upon an application of a rule to the third time. For example, the fourth time may be based upon a combination (e.g., multiplication, division, addition, subtraction, etc.) of a number and the third time.

In some examples, the second time interval may correspond to a time length between the third time and the fourth time. In some examples, the second time interval may be based upon the first time interval. Alternatively and/or additionally, the first time interval may be based upon the second time interval. In some examples, the first time interval may be larger than the second time interval. Alternatively and/or additionally, the first time interval may be smaller than the second time interval. The first time interval may be based upon a combination (e.g., multiplication, division, addition, subtraction, etc.) of a number and the second time interval. Alternatively and/or additionally, the second time interval may be based upon a combination (e.g., multiplication, division, addition, subtraction, etc.) of a number and the first time interval.

In some examples, the configuration may be based upon capability information corresponding to the first node. The capability information may comprise communication capabilities of the first node (e.g., with relation to the SPS resource and/or communication between the first node and the second node). For example, the capability information may comprise a maximum number of HARQ SPS resources (e.g., corresponding to HARQ SPS processes), that the first node can support. In some examples, the first node may receive a request message (e.g., an RRC connection request message, an RRC connection resume request message, an RRC re-establishment request message, a MAC CE message, etc.) from the second node. In some examples, the first node may transmit a message (e.g., an NOMA support capability indication, a second state related parameter support capability indication, a second state support capability indication, etc.,) comprising the capability information to the second node (e.g., and/or to an eNodeB). In some examples, the message may comprise a MAC CE message. Alternatively and/or additionally, the message may comprise an RRC message.

At 115B, the first node may activate the SPS resource based upon the configuration. In some examples, the SPS resource comprises an uplink SPS resource. For example, the first node may transmit first information to the second node using the uplink SPS resource. Alternatively and/or additionally, the first node may transmit second information to the second node using a second uplink SPS resource. In some examples, the first resource block comprises one or more HARQ SPS resources. Alternatively and/or additionally, the second resource block comprises one or more HARQ SPS resources.

In some examples, the first node may transmit the first information and/or the second information to the second node within the first resource block. The first node may receive a first acknowledge indication corresponding to the first information, at a fifth time. Alternatively and/or additionally, the first node may receive a second acknowledge indication corresponding to the second information, at the fifth time and/or a different time. In some examples, the first node may transmit third information to the second node, within the second resource block, based upon the first acknowledge indication. Alternatively and/or additionally, the first node may transmit fourth information to the second node, within the second resource block, based upon the second acknowledge indication.

In some examples, the first node may receive an acknowledge indication corresponding to the first information, at a fifth time. Alternatively and/or additionally, the first node may receive a non-acknowledge indication corresponding to the second information, at the fifth time and/or a different time. In some examples, the first node may transmit third information to the second node, within the second resource block, based upon the acknowledge indication. Alternatively and/or additionally, the first node may retransmit the second information to the second node, within the second resource block, based upon the non-acknowledge indication.

In some examples, the first node may receive a first non-acknowledge indication corresponding to the first information, at a fifth time. Alternatively and/or additionally, the first node may receive a second non-acknowledge indication corresponding to the first information, at the fifth time and/or a different time. In some examples, the first node may retransmit the first information to the second node, within the second resource block, based upon the non-acknowledge indication. Alternatively and/or additionally, the first node may retransmit the second information to the second node, within the second resource block, based upon the non-acknowledge indication.

In some examples, the SPS resource comprises a downlink SPS resource. In some examples, the first node may receive information from the second node. For example, the first node may receive first information from the second node using the downlink SPS resource. Alternatively and/or additionally, the first node may receive second information from the second node using a second downlink SPS resource.

In some examples, the first node may receive the first information and/or the second information from the second node within the first resource block. The first node may transmit a first acknowledge indication corresponding to the first information, to the second node, at a fifth time. Alternatively and/or additionally, the first node may transmit a second acknowledge indication corresponding to the second information, to the second node, at the fifth time and/or a different time. In some examples, the first node may receive third information from the second node, within the second resource block, based upon the first acknowledge indication. Alternatively and/or additionally, the first node may receive fourth information from the second node, within the second resource block, based upon the second acknowledge indication.

In some examples, the first node may transmit an acknowledge indication corresponding to the first information, to the second node, at a fifth time. Alternatively and/or additionally, the first node may determine the second information is incomplete. The first node may (e.g., then) transmit a non-acknowledge indication corresponding to the second information, to the second node, at the fifth time and/or a different time. In some examples, the first node may receive third information from the second node, within the second resource block, based upon the acknowledge indication. Alternatively and/or additionally, the first node may receive a retransmission of (e.g., and/or a second representation of) the second information from the second node, within the second resource block, based upon the non-acknowledge indication.

In some examples, the first node may determine the first information is incomplete. The first node may (e.g., then) transmit a first non-acknowledge indication corresponding to the first information, at a fifth time. Alternatively and/or additionally, the first node may determine the second information is incomplete. The first node may (e.g., then) transmit a second non-acknowledge indication corresponding to the second information, to the second node, at the fifth time and/or a different time. In some examples, the first node may receive a retransmission of (e.g., and/or a second representation of) the first information from the second node, within the second resource block, based upon the first non-acknowledge indication. Alternatively and/or additionally, the first node may receive a retransmission of (e.g., and/or a second representation of) the second information from the second node, within the second resource block, based upon the second non-acknowledge indication.

In some examples, at 120B, the first node may monitor the search space based upon the configuration. The first node may monitor the search space at the start time for a monitoring time length corresponding to the number of repetitions. The first node may (e.g., then) cease monitoring the search space. The first node may (e.g., then) monitor the search space at the second time. In some examples, the first node may receive a message at a time. In some examples, the message may be received by the first node using a PDCCH resource. In some examples, the message may be formatted with a DCI format. Alternatively and/or additionally, the message may comprise an RRC message. Alternatively and/or additionally, the message may comprise a MAC CE message. Alternatively and/or additionally, the message may comprise an SIB. In some examples, the first node may monitor the search space at the time. Alternatively and/or additionally, the first node may not monitor the search space at the time. The first node may (e.g., then) deactivate the SPS resource based upon the message. In some examples, the first node may transmit a message at the time. The first node may (e.g., then) deactivate the SPS resource based upon the message.

The search space may comprise one or more PDCCHs. Alternatively and/or additionally, the search space may comprise a USS and/or a CSS.

Figure 1C:
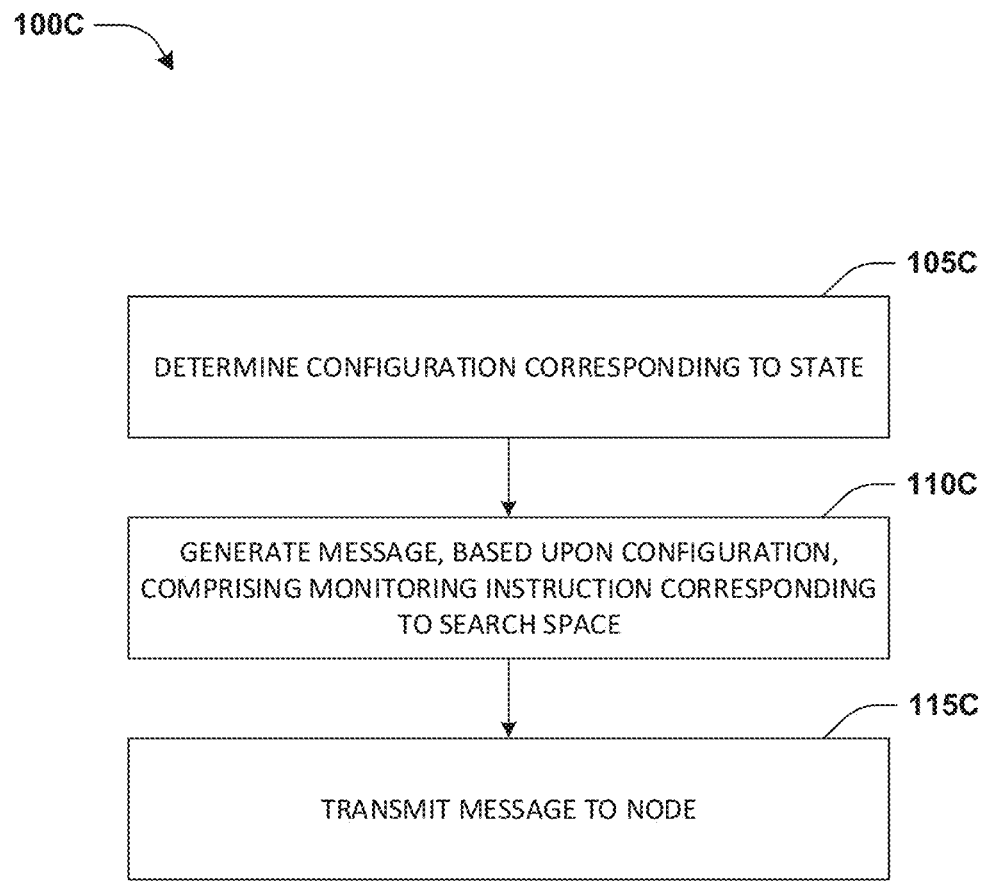
FIG. 1C is a flow chart illustrating an example method for switching from a first state to a second state.

An example method 100C of switching from a first state to a second state is illustrated in FIG. 1C. In some examples, a first node may operate in the first state. The first node may comprise a UE. At 105C, a second node (e.g., network and/or BS) may determine a configuration corresponding to a second state. In some examples, the second state may comprise an energy saving state. In some examples, the configuration may be determined based upon the first state.

In some examples, the configuration may be determined based upon capability information corresponding to the first node. The capability information may comprise communication capabilities of the first node in the second state (e.g., related to communication between the first node, in the second state, and the second node). In some examples, the second node may transmit a request message (e.g., an RRC connection request message, an RRC connection resume request message, an RRC re-establishment request message, a MAC CE message, etc.) to the first node. In some examples, the second node (e.g., and/or an eNodeB) may receive a capability information message (e.g., an NOMA support capability indication, a second state related parameter support capability indication, a second state support capability indication, etc.,) comprising the capability information from the first node. In some examples, the capability information message may comprise a MAC CE message. Alternatively and/or additionally, the capability information message may comprise an RRC message.

In some examples, the configuration may be based upon one or more system parameters. The one or more system parameters may comprise one or more service types and/or one or more service characteristics. In some examples, the one or more service types may comprise continuity of data transmission and/or a size of data. In some examples, the one or more service characteristics may comprise a QoS, a size of a transfer block, a cycle of service and/or a periodicity. In some examples, the second node may transmit a request message to the first node. In some examples, the second node (e.g., and/or an eNodeB) may receive a system parameter message comprising the one or more system parameters from the first node. In some examples, the system parameter message may be transmitted using UE-specific signaling and/or a Uu interface (e.g., LTE radio interface). In some examples, the system parameter message may comprise a MAC CE message. Alternatively and/or additionally, the system parameter message may comprise an RRC message. Alternatively and/or additionally, the second node (e.g., and/or an eNodeB) may receive a second system parameter message comprising the one or more system parameters from a third node and/or from a mobility management entity (MME). In some examples, the second system parameter message may be transmitted using an S1 interface and/or a next-generation (NG) interface. In some examples, the second system parameter message may comprise an S1 Application Protocol (S1AP) message and/or an NG Application Protocol (NGAP) message comprising a specified QoS Class Identifier (QCI) value indicative of the one or more service types and/or the one or more service characteristics. In some examples, the second system parameter message may comprise an S1AP message and/or an NGAP message comprising one or more parameters corresponding to the one or more service types and/or one or more indications corresponding to the one or more service characteristics. In some examples, the second system parameter message may be transmitted using an X2 interface and/or an Xn interface (e.g., from a first eNodeB to a second eNodeB). In some examples, the second system parameter message may comprise an X2AP message and/or an Xn message including a specified QCI value to indicate the one or more service types and/or the one or more service characteristics. In some examples, the second system parameter message may comprise an X2AP message and/or an XnAP message comprising one or more parameters corresponding to the one or more service types and/or one or more indications corresponding to the one or more service characteristics.

At 110C, the second node may generate a message, based upon the configuration, comprising a monitoring instruction corresponding to a search space. The search space may comprise one or more PDCCHs. Alternatively and/or additionally, the search space may comprise a USS and/or a CSS.

The message (e.g., and/or the monitoring instruction) may be indicative of the second state, the search space, a start time, a time interval and/or a number of repetitions. In some examples, the message may be formatted with a DCI format. Alternatively and/or additionally, the message may comprise a MAC CE message. Alternatively and/or additionally, the message may comprise an RRC message. Alternatively and/or additionally, the message may comprise an SIB.

At 115C, the second node may transmit the message to the first node. In some examples, the message may be transmitted to the first node using a PDCCH resource. In some examples, the message may be formatted with a DCI format. Alternatively and/or additionally, the message may comprise a MAC CE message. Alternatively and/or additionally, the message may comprise an RRC message. Alternatively and/or additionally, the message may comprise an SIB.

In some examples, the second node may perform data transmission with the first node. The data transmission may comprise transmitting data to the first node and/or receiving data from the first node. In some examples, the message may be transmitted to the first node responsive to a completion of the data transmission. Alternatively and/or additionally, the start time may be based upon the completion of the data transmission. In some examples, the completion of the data transmission may correspond to a time when data has been (e.g., completely) transmitted to the first node and/or (e.g., completely) received from the first node.

In some examples, the second node (e.g., and/or the first node) may start a timer responsive to the completion of data transmission. The message may be transmitted to the first node responsive to a timeout of the timer. Alternatively and/or additionally, the start time may be based upon the timeout. The timer may timeout responsive to the second node performing no data transmission for a specified time length.

In some examples, the configuration is indicative of a time corresponding to (e.g., the first node monitoring) the search space. The second node may generate a second message indicative of (e.g., the first node switching from the second state to) a third state. The second node may (e.g., then) transmit the second message to the first node at the time. The second message may be transmitted using a PDCCH resource. In some examples, the message may be formatted with a DCI format. Alternatively and/or additionally, the second message may comprise a MAC CE message. Alternatively and/or additionally, the second message may comprise an RRC message. Alternatively and/or additionally, the second message may comprise an SIB.

Figure 1D:
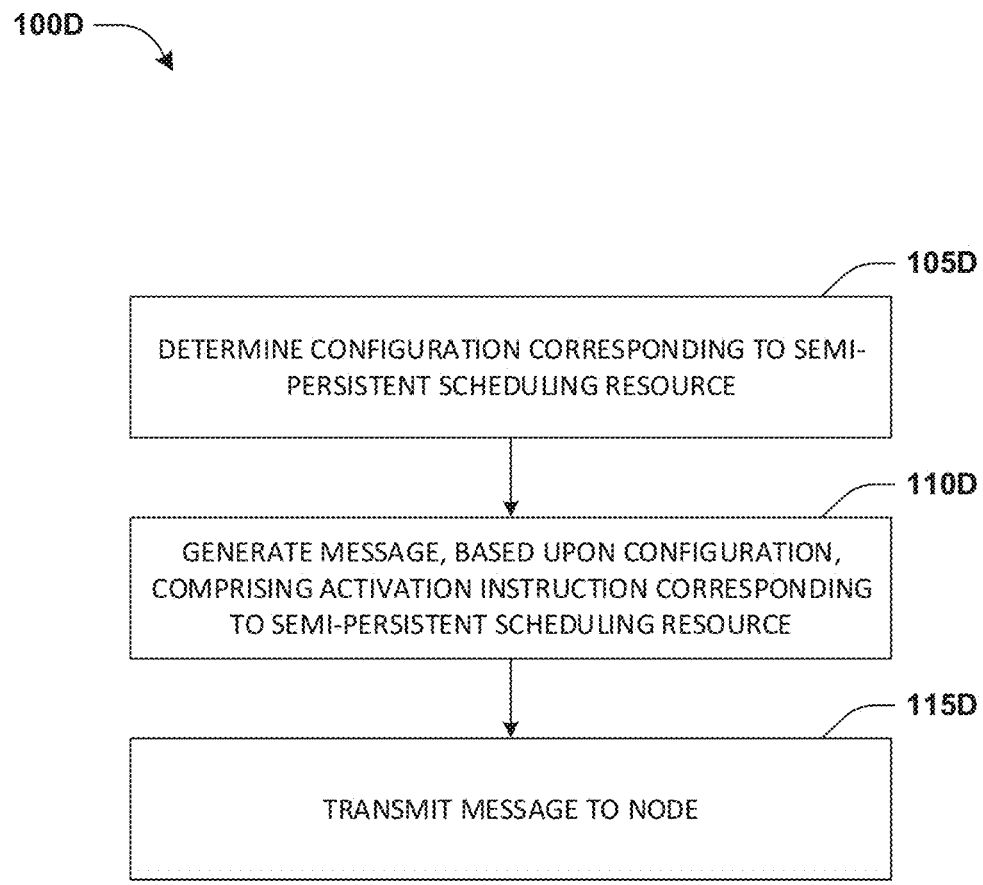
FIG. 1D is a flow chart illustrating an example method for using an SPS resource.

An example method 100D of using an SPS resource is illustrated in FIG. 1D. A first node may comprise a UE. At 105D, a second node (e.g., network and/or BS) may determine a configuration corresponding to the SPS resource. In some examples, the configuration may be determined based upon capability information corresponding to the first node. The capability information may comprise communication capabilities of the first node (e.g., with relation to the SPS resource and/or communication between the first node and the second node). In some examples, the second node (e.g., and/or an eNodeB) may receive a capability information message (e.g., an NOMA support capability indication, a second state related parameter support capability indication, a second state support capability indication, etc.,) comprising the capability information from the first node. In some examples, the capability information message may comprise a MAC CE message. Alternatively and/or additionally, the capability information message may comprise an RRC message.

In some examples, the configuration may be based upon one or more system parameters. The one or more system parameters may comprise one or more service types and/or one or more service characteristics. In some examples, the one or more service types may comprise continuity of data transmission and/or a size of data. In some examples, the one or more service characteristics may comprise a QoS, a size of a transfer block, a cycle of service and/or a periodicity. In some examples, the second node may transmit a request message to the first node. In some examples, the second node (e.g., and/or an eNodeB) may receive a system parameter message comprising the one or more system parameters from the first node. In some examples, the system parameter message may be transmitted using UE-specific signaling and/or a Uu interface (e.g., LTE radio interface). In some examples, the system parameter message may comprise a MAC CE message. Alternatively and/or additionally, the system parameter message may comprise an RRC message. Alternatively and/or additionally, the second node (e.g., and/or an eNodeB) may receive a second system parameter message comprising the one or more system parameters from a third node (e.g., and/or from an MME). In some examples, the second system parameter message may be transmitted using an Si interface and/or an NG interface. In some examples, the second system parameter message may comprise an S1AP message and/or an NGAP message comprising a specified QCI value indicative of the one or more service types and/or the one or more service characteristics. In some examples, the second system parameter message may comprise an S1AP message and/or an NGAP message comprising one or more parameters corresponding to the one or more service types and/or one or more indications corresponding to the one or more service characteristics. In some examples, the second system parameter message may be transmitted using an X2 interface and/or an Xn interface (e.g., from a first eNodeB to a second eNodeB). In some examples, the second system parameter message may comprise an X2AP message and/or an Xn message including a specified QCI value to indicate the one or more service types and/or the one or more service characteristics. In some examples, the second system parameter message may comprise an X2AP message and/or an XnAP message comprising one or more parameters corresponding to the one or more service types and/or one or more indications corresponding to the one or more service characteristics. At 110D, the second node may (e.g., then) generate a message, based upon the configuration, comprising an activation instruction corresponding to the SPS resource. The activation instruction may be configured to trigger activation of the SPS resource. In some examples, the message may be formatted with a DCI format. Alternatively and/or additionally, the message may comprise an RRC message. Alternatively and/or additionally, the message may comprise a MAC CE message. Alternatively and/or additionally, the message may comprise an SIB. In some examples, the configuration may be indicative of a search space, a start time, a number of repetitions and/or a first time interval. The message may comprise a monitoring instruction indicative of the start time, corresponding to (e.g., the first node monitoring) the search space, and/or a second time, corresponding to (e.g., the first node monitoring) the search space. In some examples, the second time is determined based upon the start time and the first time interval.

At 115D, the second node may transmit the message to the node. In some examples, the message is transmitted to the first node using a PDCCH resource. In some examples, the message may be formatted with a DCI format. Alternatively and/or additionally, the message may comprise an RRC message. Alternatively and/or additionally, the message may comprise a MAC CE message. Alternatively and/or additionally, the message may comprise an SIB. In some examples, the configuration may be indicative of a third time corresponding to a first resource block, a fourth time corresponding to a second resource block and a second time interval. In some examples, the first resource block comprises one or more HARQ SPS resources. Alternatively and/or additionally, the second resource block may comprise one or more HARQ SPS resources.

In some examples, the SPS resource comprises a downlink SPS resource. For example, the second node may transmit first information to the first node (e.g., within the first resource block) using the downlink SPS resource. Alternatively and/or additionally, the second node may transmit second information to the first node (e.g., within the first resource block) using a second downlink SPS resource.

In some examples, the second node may receive an acknowledge indication corresponding to the first information, at a fourth time. Alternatively and/or additionally, the first node may receive a non-acknowledge indication corresponding to the second information, at the fourth time and/or a different time. The second node may (e.g., then) transmit third information to the first node (e.g., within the second resource block), based upon the acknowledge indication. Alternatively and/or additionally, the second node may retransmit the second information to the first node (e.g., within second first resource block), based upon the non-acknowledge indication.

In some examples, the SPS resource comprises an uplink SPS resource. In some examples, the second node may receive information from the first node. For example, the second node may receive first information from the first node using the uplink SPS resource. Alternatively and/or additionally, the second node may receive second information from the first node using a second uplink SPS resource.

In some examples, the second node may transmit an acknowledge indication corresponding to the first information, to the first node, at a fourth time. Alternatively and/or additionally, the second node may determine the second information is incomplete. The second node may (e.g., then) transmit a second message corresponding to the second information, to the first node, at a time. In some examples, the second message may be transmitted at the second time. The second message may be transmitted using a PDCCH resource. In some examples, the second message may be formatted with a DCI format. Alternatively and/or additionally, the second message may comprise an RRC message. Alternatively and/or additionally, the second message may comprise a MAC CE message. Alternatively and/or additionally, the second message may comprise an SIB. Alternatively and/or additionally, the second message may be transmitted at the fourth time. The second message may comprise a non-acknowledge indication. The second node may receive third information from the first node (e.g., within the second resource block), based upon the acknowledge indication. Alternatively and/or additionally, the second node may receive a retransmission of (e.g., and/or a second representation of) the second information (e.g., within the second resource block), based upon the second message.

In some examples, the second node may generate a third message comprising a deactivation instruction based upon the configuration. The deactivation instruction may be configured to trigger deactivation of the SPS resource. The second node may transmit the third message, to the first node, a time (e.g., when the first node is monitoring the search space) based upon the monitoring instruction. In some examples, the third message may be transmitted using a PDCCH. In some examples, the third message may be formatted with a DCI format. Alternatively and/or additionally, the third message may comprise an RRC message. Alternatively and/or additionally, the third message may comprise a MAC CE message. Alternatively and/or additionally, the third message may comprise an SIB.

Figure 2:
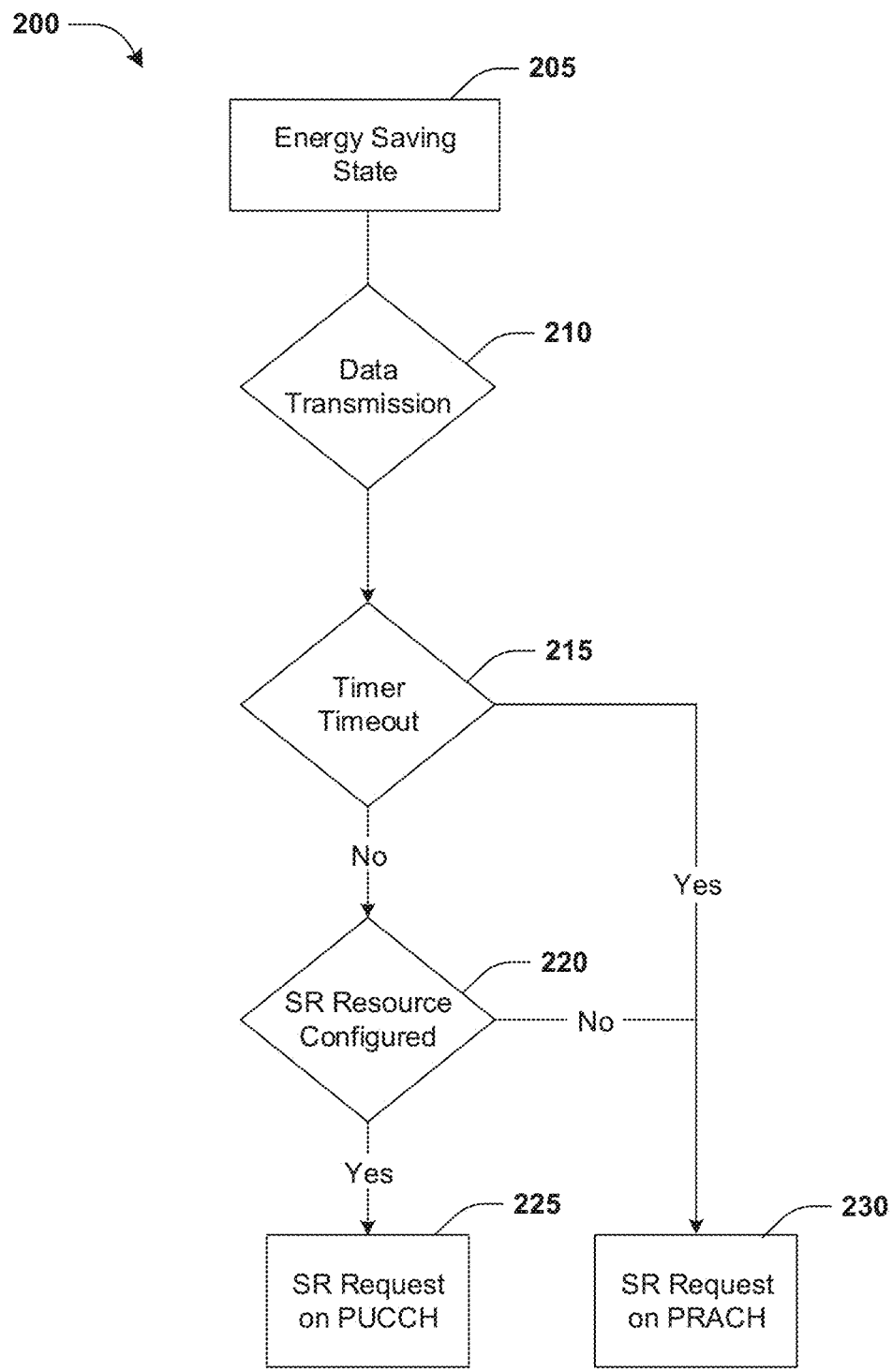
FIG. 2 is a block diagram illustrating an example system for facilitating operation of a first node in a state.

FIG. 2 illustrates an example of a system 200 for facilitating operation of a first node in a state 205. In some examples, the state 205 is an energy saving state. The first node may comprise a UE. The first node may not detect (e.g., monitor for, identify, receive) various (e.g., types of) information (e.g., CSI report, SRS, channel quality indicator, etc.) in (e.g., during) the state 205. The first node may enter the state 205 (e.g., responsive to leaving a second state). The first node may remain in the state 205 until a time based upon a data transmission condition 210.

In some examples, the first node may initiate (e.g., and/or trigger) a scheduling request (SR request) based upon (e.g., a demand to perform) data transmission between the first node and a second node (e.g., network and/or BS) (e.g., based upon the data transmission condition 210). In some examples, the data transmission comprises data transmission from the first node to the second node and/or data transmission from the second node to the first node.

In some examples, first node may initiate (e.g., and/or trigger) the SR request based upon a timer timeout condition 215 and/or an SR resource condition 220. In some examples, the first node may initiate (e.g., and/or trigger) the SR request using a physical random access channel (PRACH) (e.g., first SR request initiation 225) (e.g., corresponding to a cyclic prefix (CP), a guard period, a sequence, etc.) responsive to a timer (e.g., timeAlignmentTimer) timeout and/or a non-availability of a configured SR resource (e.g., based upon the timer timeout condition 215 and/or the SR resource condition 220).

Alternatively and/or additionally, the first node may initiate (e.g., and/or trigger) the SR request (e.g., directly) using an SR resource and/or a PUCCH (e.g., second SR request initiation 230) responsive to no timer timeout and/or an availability of a configured SR resource (e.g., based upon the timer timeout condition 215 and/or the SR resource condition 220).

Figure 3:
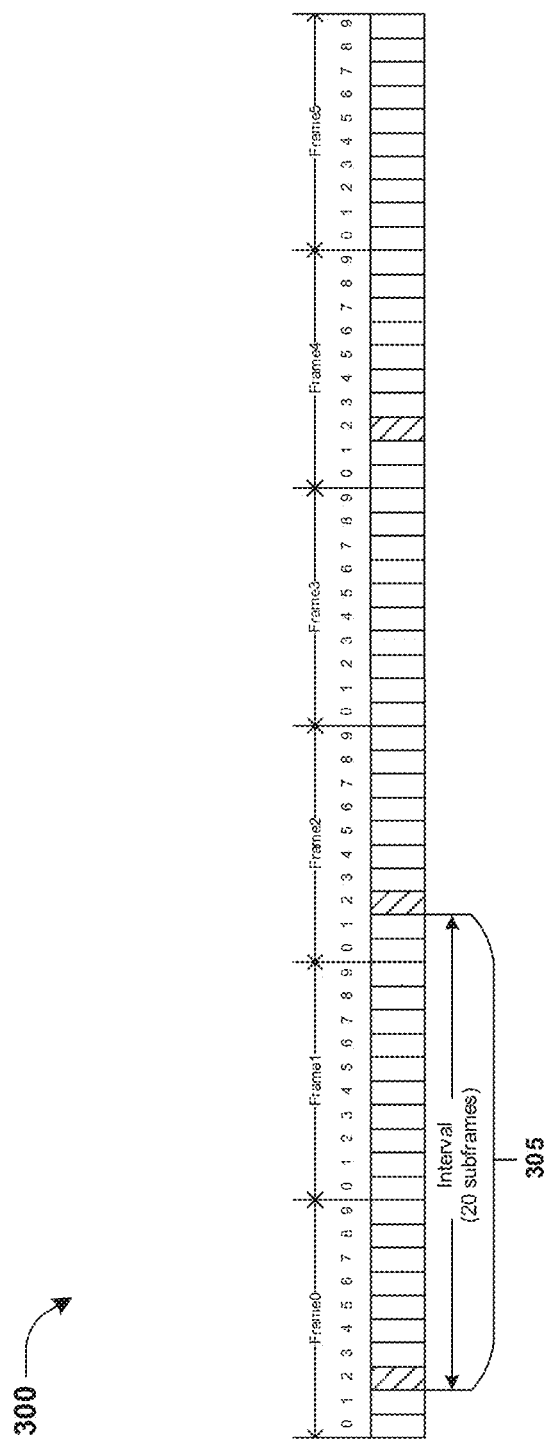
FIG. 3 is a diagram illustrating an example system for facilitating operation of a first node in a state.

FIG. 3 illustrates an example of a system 300 for facilitating operation of a first node in a state. In some examples, the first node may comprise a UE. In some examples, the first node may monitor a search space. In some examples, the search space may comprise a USS and/or a CSS. In some examples, the search space may be based upon a second search space corresponding to a second (e.g., connection mode) state. In some examples, the search space may comprise one or more PDCCHs.

In some examples, the first node may monitor the search space at (e.g., a time corresponding to) subframe2 of frame0. The first node may (e.g., then) cease monitoring the search space until subframe2 of frame2. The first node may (e.g., then) monitor the search space at the subframe2 of frame2. Accordingly, a monitoring interval 305 of the state may be equal to 20 subframes based upon a time length between the subframe2 of frame0 and the subframe 2 of frame2.

In some examples, the state may correspond to an energy saving state. Alternatively and/or additionally, the search space may be monitored based upon a paging procedure. The paging procedure may comprise a second node (e.g., network and/or BS) broadcasting a public address message at a time when the first node is monitoring the search space. For example, the monitoring interval 305 (e.g., of the state may) correspond to a paging cycle and/or a discontinuous reception (DRX) cycle. Alternatively and/or additionally, the search space may be based upon the paging procedure.

Figure 4:
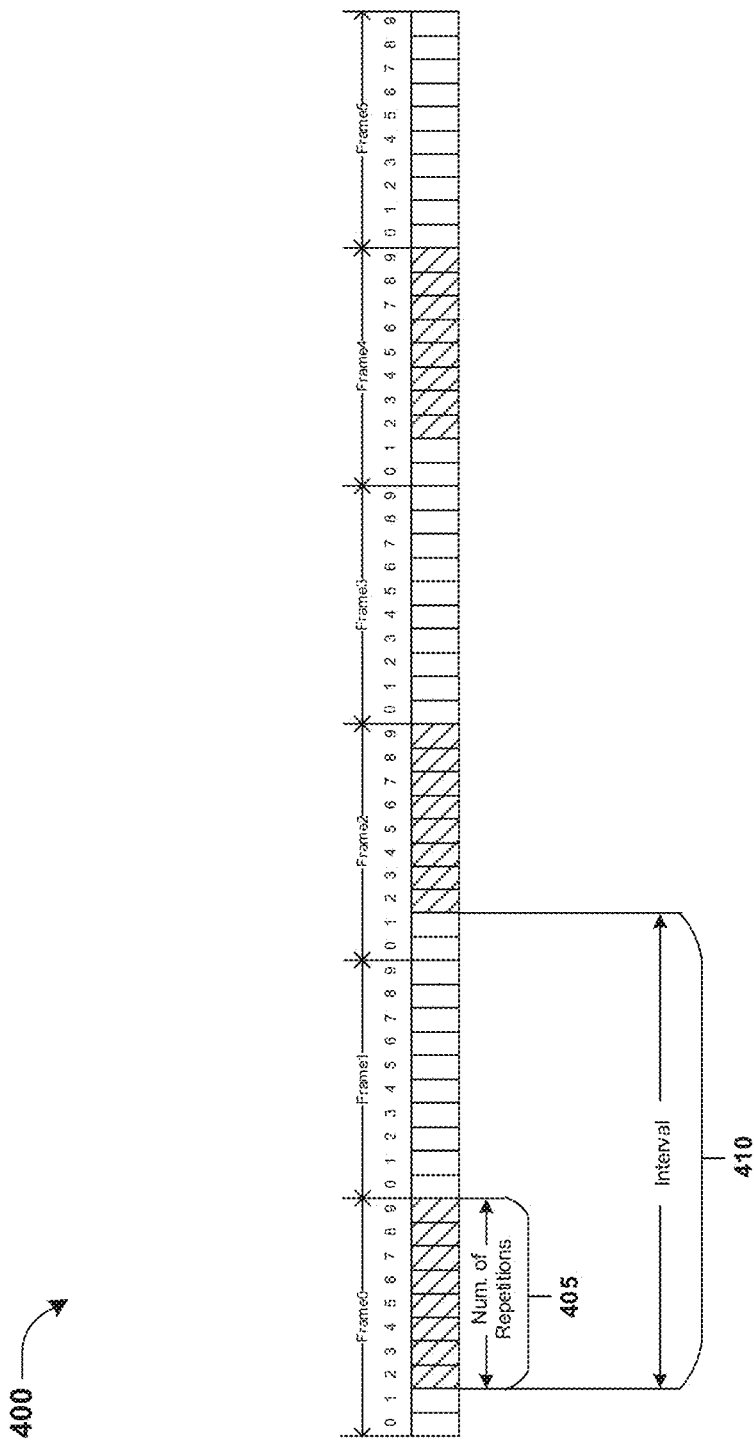
FIG. 4 is a diagram illustrating an example system for facilitating operation of a first node in a state.

FIG. 4 illustrates an example of a system 400 for facilitating operation of a first node in a first state. In some examples, the first node may comprise a UE. In some examples, the first node may monitor a search space. In some examples, the search space may comprise a USS and/or a CSS. In some examples, the search space may be based upon a second search space corresponding to a second (e.g., connection mode) state. In some examples, the search space may comprise one or more PDCCHs.

In some examples, the first node may monitor the search space at (e.g., a time corresponding to) subframe2 of frame0. In some examples, the first node may monitor the search space for a monitoring time length 405 corresponding to a (e.g., maximum) number of repetitions. For example, the monitoring time length 405 may be equal to eight subframes based upon a time length between the (e.g., first node monitoring the search space at the) subframe2 of frame0 and the (e.g., first node monitoring the search space at the) subframe9 of frame0. The first node may (e.g., then) cease monitoring the search space until subframe2 of frame2. The first node may (e.g., then) monitor the search space, beginning at the subframe2 of frame2, for the monitoring time length (e.g., eight subframes). Accordingly, a monitoring interval 410 of the first state may be equal to 20 subframes based upon a time length between the subframe2 of frame0 and the subframe 2 of frame2.

In some examples, the first state may correspond to an energy saving state. Alternatively and/or additionally, the search space may be monitored based upon a paging procedure. The paging procedure may comprise a second node (e.g., network and/or BS) broadcasting a public address message at a time when the first node is monitoring the search space. For example, the monitoring interval 410 (e.g., of the state may) correspond to a paging cycle and/or a DRX cycle. Alternatively and/or additionally, the search space may be based upon the paging procedure.

In some examples, the first state may be based upon the second state. For example, the monitoring time length 405 may be based upon a combination (e.g., multiplication, division, addition, subtraction, etc.) of a number and a second monitoring time length corresponding to the second state. Alternatively and/or additionally, the monitoring interval 410 may be based upon a combination (e.g., multiplication, division, addition, subtraction, etc.) of a number and a second monitoring interval corresponding to the second state.

Figure 5:
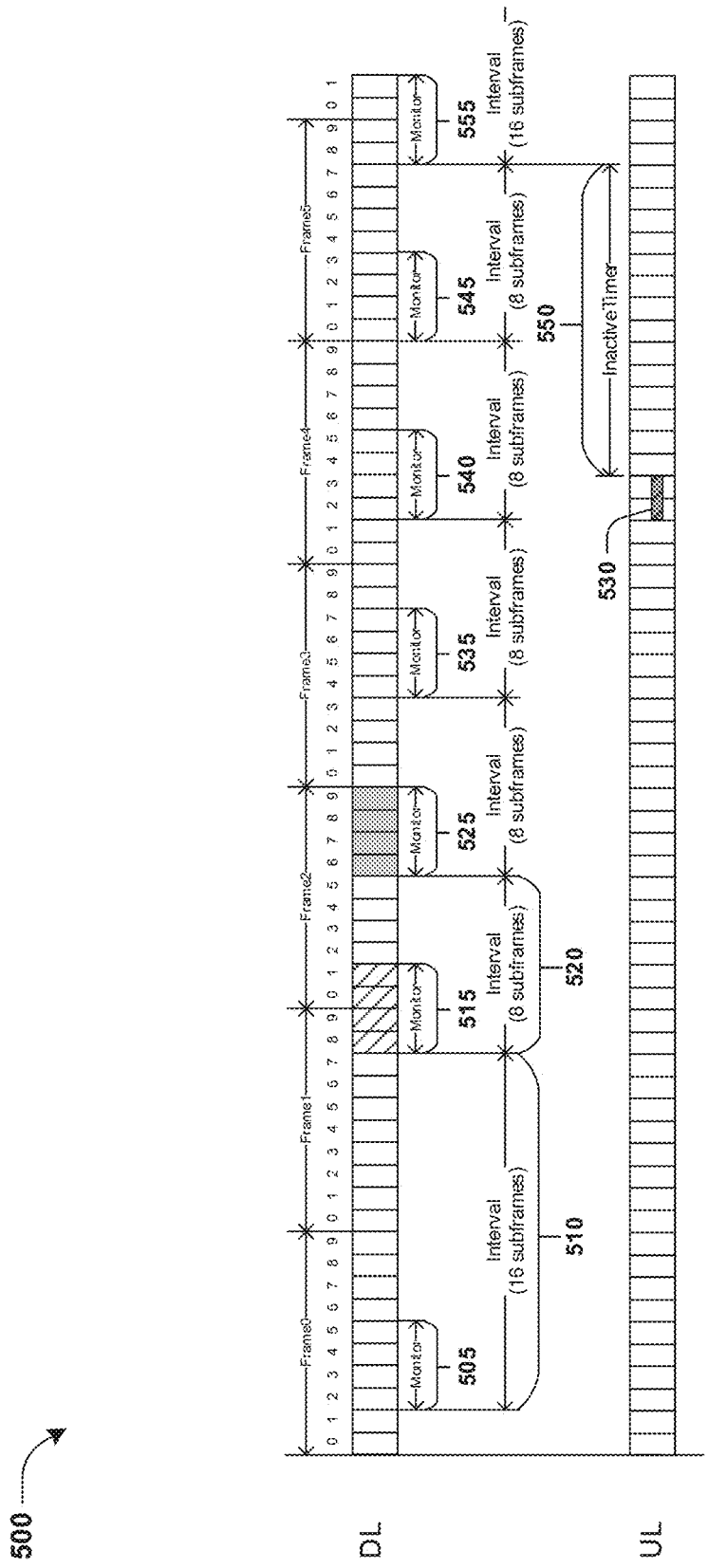
FIG. 5 is a diagram illustrating an example system for facilitating operation of a first node in a state.

FIG. 5 illustrates an example of a system 500 for facilitating operation of a first node in a first state (e.g., energy saving state). The first node may comprise a UE. In some examples, the system 500 may be based upon a low power wide area network (LPWAN) standard. Alternatively and/or additionally, the system 500 may comprise a narrowband interne of things (NB-IoT) system. Alternatively and/or additionally, the system 500 may comprise a Next Radio (NR) system. In some examples, the first node may monitor a search space. In some examples, the search space may comprise a USS and/or a CSS. In some examples, the search space may be based upon a second search space corresponding to a second (e.g., connection mode) state. In some examples, the search space may comprise one or more PDCCHs.

In some examples, the first node may operate in the first state. In some examples, the first node may monitor the search space in a first monitoring instance 505 at (e.g., a time corresponding to) subframe2 of frame0 until subframe5 of frame0. A monitoring time length (e.g., corresponding to the first state) of the first monitoring instance 505 may correspond to a (e.g., maximum) number of repetitions. The monitoring time length is equal to (e.g., a time length corresponding to) four subframes. The monitoring time length may be based upon a combination (e.g., multiplication, division, addition, subtraction, etc.) of a number and a second monitoring time length corresponding to the second state. For example, the monitoring time length (e.g., four subframes) may be equal to the second monitoring time length (e.g., four subframes).

The first node may (e.g., then) cease monitoring the search space until subframe7 of frame1. The first node may (e.g., then) monitor the search space, beginning at subframe8 of frame1, for the second monitoring time length (e.g., four subframes). Accordingly, a monitoring interval 510 of the first state may be equal to 16 subframes based upon a time length between the subframe2 of frame0 and the subframe7 of frame1. In some examples, the monitoring interval 510 may be based upon a combination (e.g., multiplication, division, addition, subtraction, etc.) of a number and the monitoring time length. For example, the monitoring interval 510 may be based upon a combination (e.g., multiplication, division, addition, subtraction, etc.) of a number and the monitoring time length. Accordingly, the monitoring interval 510 may be equal to an interval scale value (e.g., four) multiplied with the monitoring time length (e.g., four subframes). In this way, the monitoring interval 510 may be equal to 16 subframes.

In some examples, the monitoring interval 510 may be based upon a combination (e.g., multiplication, division, addition, subtraction, etc.) of a number and a second monitoring interval 520 corresponding to the second state. For example, the monitoring interval 510 may be equal to a second interval scale value (e.g., two) multiplied with the second monitoring interval 520 (e.g., eight subframes). In this way, the monitoring interval 510 may be equal to 16 subframes.

In some examples, the monitoring interval 510 and/or the monitoring time length may be based upon a message received from a second node (e.g., network and/or BS). For example, the message may be indicative of the monitoring interval 510 and/or the monitoring time length. Alternatively and/or additionally, the message may be indicative of a number (e.g., the interval scale value and/or the second interval scale value) and/or a rule. In some examples, the monitoring interval 510 and/or the monitoring time length may be based upon one or more rules. The one or more rules may be pre-defined and/or standard. Alternatively and/or additionally, the message may be indicative of the one or more rules.

In some examples, the monitoring interval 510 and/or the monitoring time length may be based upon a muting value. For example, the monitoring time length may be based upon a combination (e.g., multiplication, division, addition, subtraction, etc.) of the muting value (e.g., ¾) and the monitoring interval 510. Alternatively and/or additionally, the monitoring time length may be based upon muting (e.g., the monitoring of) the search space for a muting time length corresponding to the muting value (e.g., ¾ multiplied by monitoring interval 510) (e.g., 12 subframes). Accordingly, the first node may not mute (e.g., the monitoring of) the search space for the monitoring time length based upon the muting time length and/or the monitoring interval 510.

In some examples, the first node may (e.g., then) monitor the search space in a second monitoring instance 515 at subframe8 of frame1 until subframe1 of frame2. The first node may receive a message (e.g., from the second node) within the second monitoring instance 515. In some examples, the message may be received using a PDCCH and/or a physical downlink shared channel (PDSCH). Alternatively and/or additionally, the message may be received using a narrowband PDCCH (NPDCCH) and/or a narrowband PDSCH (NPDSCH). In some examples, the first node may switch from the first state to the second state based upon (e.g., and/or responsive to receiving) the message.

In some examples, the first node may (e.g., then) monitor a second search space (e.g., and/or the search space) in a third monitoring instance 525. The second search space may comprise one or more PDCCHs and/or one or more PDSCHs. Alternatively and/or additionally, the second search space may comprise one or more NPDCCHs and/or on or more NPDSCHs. The first node may (e.g., then) monitor the second search space (e.g., and/or the search space) in a fourth monitoring instance 535, a fifth monitoring instance 540 and/or a sixth monitoring instance 545 based upon the second monitoring interval 520 (e.g., equal to eight subframes). In some examples, the third monitoring instance 525, the fourth monitoring instance 535 and/or the fifth monitoring instance 540 may comprise a plurality of (e.g., invalid) subframes. Alternatively and/or additionally, the first node may postpone data transmission (e.g., comprising transmitting and/or receiving data using a PDCCH and/or a PDSCH) during the plurality of (e.g., invalid) subframes.

In some examples, the first node may transmit a feedback indication 530 (e.g., comprising an acknowledge indication and/or a non-acknowledge indication) corresponding to the message, to the second node. Alternatively and/or additionally, the feedback indication may be transmitted using a HARQ resource. The second node and/or the first node may start a timer (e.g., InactiveTimer) at subframe4 of frame4 responsive to a completion of data transmission (e.g., the feedback indication) at subframe3 of frame4. The timer may timeout at subframe7 of frame5 responsive to the first node performing no data transmission for a specified time length 550 (e.g., 14 subframes). In some examples, the first node may enter the first state (e.g., at subframe8 of frame5) responsive to the timeout of the timer. The first node may (e.g., then) monitor the search space in a seventh monitoring instance 555.

Figure 6A:
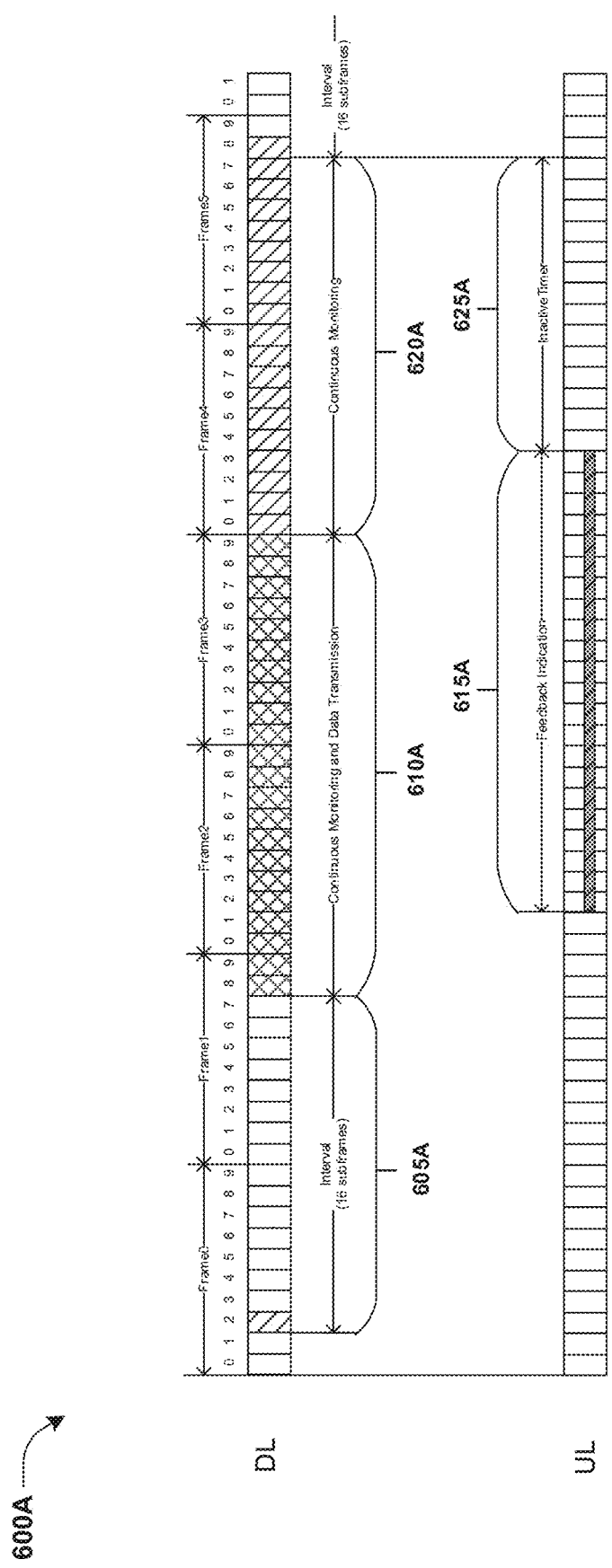
FIG. 6A is a diagram illustrating an example system for facilitating operation of a first node in a state.

FIG. 6A illustrates an example of a system 600A for facilitating operation of a first node in a first (e.g., energy saving) state. In some examples, the system 600A may be based upon a long-term evolution (LTE) standard. The first node may comprise a UE. In some examples, the first node may monitor a search space. In some examples, the search space may comprise a USS and/or a CSS. In some examples, the search space may be based upon a second search space corresponding to a second (e.g., connection mode) state. In some examples, the search space may comprise one or more PDCCHs.

In some examples, the first node may operate in the first state. In some examples, the first node may monitor the search space within a first monitoring interval 605A at (e.g., a time corresponding to) subframe2 of frame0. The first node may (e.g., then) cease monitoring the search space until subframe7 of frame1. The first node may (e.g., then) monitor the search space, beginning at subframe8 of frame1. Accordingly, the monitoring interval 605A of the first state may be equal to 16 subframes based upon a time length between the subframe2 of frame0 and the subframe7 of frame1.

In some examples, the monitoring interval 605A may be based upon a combination (e.g., multiplication, division, addition, subtraction, etc.) of a number and a monitoring time length corresponding to a (e.g., maximum) number of repetitions. In some examples, the monitoring interval 605A and/or the monitoring time length may be based upon a (e.g., pre-defined and/or standard) rule. In some examples, the monitoring interval 605A and/or the monitoring time length may be based upon a message received from a second node (e.g., network and/or BS). For example, the message may be indicative of the monitoring interval 605A and/or the monitoring time length. Alternatively and/or additionally, the message may comprise an RRC message. Alternatively and/or additionally, the message may comprise a MAC CE message. Alternatively and/or additionally, the message may comprise an SIB.

In some examples, the first node may enter the second state at subframe8 of frame1. In some examples, the first node may (e.g., then) monitor the search space at the subframe8 of frame1. The first node may receive a message (e.g., from the second node) (e.g., and/or transmit a message to the second node) at the subframe8 of frame1. In some examples, the message may be received using a PDCCH and/or a PDSCH.

In some examples, the first node may (e.g., then) monitor a second search space (e.g., and/or the search space) in a first continuous monitoring instance 610A. The second search space may comprise one or more PDCCHs and/or one or more PDSCHs. The first node may monitor the second search space at a beginning of the first continuous monitoring instance 610A (e.g., the subframe8 of frame2) until an end of the first continuous monitoring instance 610A (e.g., subframe9 of frame3). The first node may receive (e.g., and/or transmit) one or more messages (e.g., continuously) from the second node (e.g., and/or to the second node) within the first continuous monitoring instance 610A.

In some examples, the first node may (e.g., then) monitor the second search space in a second continuous monitoring instance 620A. The first node may monitor the second search space at a beginning of the second continuous monitoring instance 620A (e.g., subframe0 of frame4) until an end of the first continuous monitoring instance 620A (e.g., subframe7 of frame5). In some examples, the first node may not receive a message from the second node throughout the second continuous instance 620A.

In some examples, the first node may transmit (e.g., and/or receive) a plurality of indications 615A (e.g., and/or merely one indication) (e.g., comprising one or more acknowledge indications and/or one or more non-acknowledge indications) corresponding to the one or more messages received from the second node throughout the first continuous monitoring instance 610A. In some examples, the plurality of indications 615A may be transmitted using one or more HARQ resources. The second node and/or the first node may start a timer (e.g., InactiveTimer) at subframe4 of frame4 responsive to a completion of data transmission (e.g., of the plurality of indications 615A) at subframe3 of frame4. The timer may timeout at subframe7 of frame5 responsive to the first node performing no data transmission for a specified time length 625A (e.g., 14 subframes). In some examples, the first node may enter the first state (e.g., at subframe8 of frame5) responsive to the timeout of the timer.

Figure 6B:
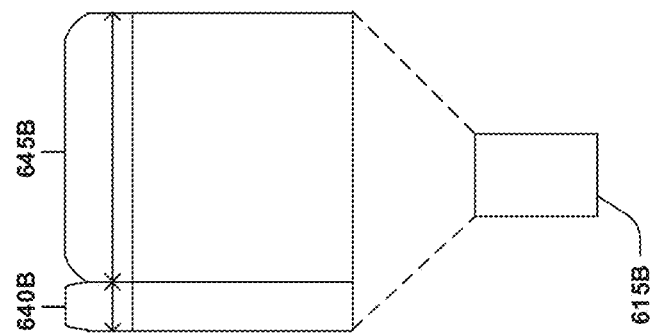
FIG. 6B is a diagram illustrating an example of a first subframe configuration, a second subframe configuration and/or a third subframe configuration.
Figure 6B:
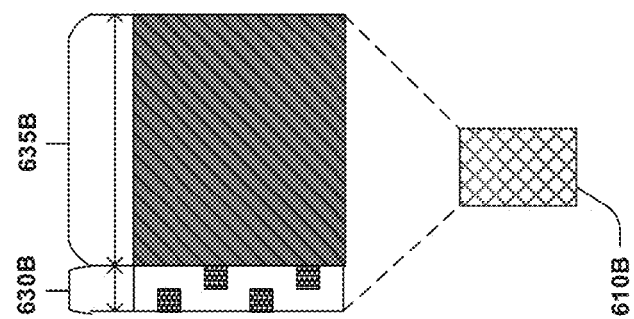
Figure 6B:
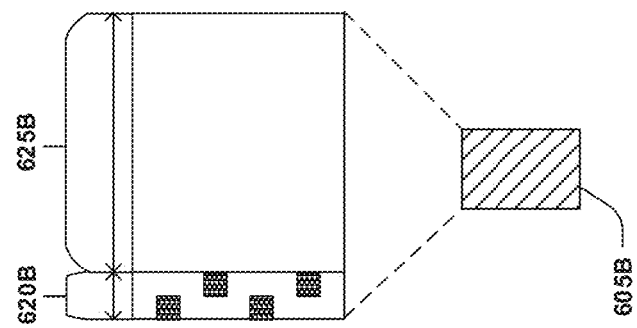

FIG. 6B illustrates a diagram 600B for an example of a first subframe configuration 605B, a second subframe configuration 610B and/or a third subframe configuration 615B. In some examples, the first subframe configuration 605B may comprise monitoring (e.g., one or more PDCCHs of) the search space and/or the second search space in a control region 620B and/or not receiving (e.g., and/or transmitting) a message in a data region 625B. The first subframe configuration 605B may correspond to monitoring the search space in the first monitoring interval 605A in the first state (e.g., at the subframe2 of frame0) and/or monitoring the second search space (e.g., and/or the search space) in the second continuous monitoring instance 620A (e.g., at the subframe0 of frame4 until the subframe7 of frame5).

In some examples, the second subframe configuration 610B may comprise monitoring (e.g., one or more PDCCHs of) the search space and/or the second search space in a control region 630B and/or receiving (e.g., and/or transmitting) a message in a data region 635B. The first subframe configuration 610B may correspond to monitoring the second search space (e.g., and/or the search space) in the first continuous monitoring instance 610A (e.g., at the subframe8 of frame2 until the subframe9 of frame3).

In some examples, the third subframe configuration 615B may comprise not monitoring (e.g., one or more PDCCHs of) the search space and/or the second search space in a control region 640B and/or not receiving (e.g., and/or transmitting) a message in a data region 645B. The third subframe configuration 615B may correspond to the first node ceasing to monitor the search space (e.g., at the subframe3 of frame0 until the subframe7 of frame1).

Figure 7:
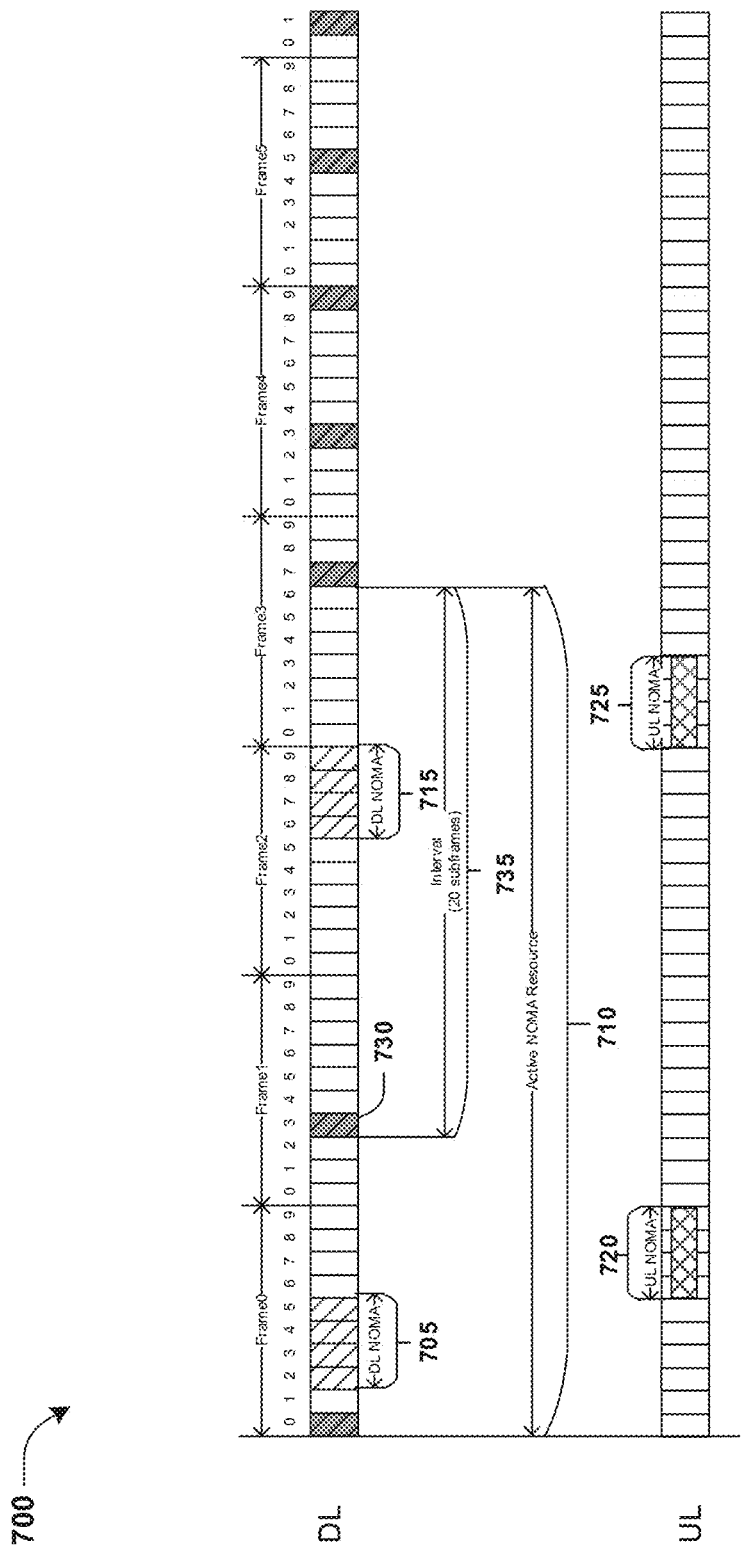
FIG. 7 is a diagram illustrating an example system for facilitating operation of a first node in a state.

FIG. 7 illustrates an example of a system 700 for facilitating operation of a first node in a first state 710. The first node may comprise a UE. In some examples, the first node may monitor a search space in the first state. In some examples, the search space may comprise a USS and/or a CSS. In some examples, the search space may be based upon a second search space corresponding to a second (e.g., connection mode) state. Alternatively and/or additionally, the search space may be based upon an NOMA (e.g., grant-free scheduling) resource. In some examples, the search space may comprise one or more PDCCHs.

In some examples, the first node may monitor the search space at (e.g., a time corresponding to) subframe0 of frame0. The first node and/or a second node (e.g., network and/or BS) may activate the NOMA resource at the subframe0 of frame0. In some examples, the NOMA resource is activated based upon a message received from the second node. In some examples, the message may be received at the subframe0 of frame0 and/or at a different time. In some examples, the message is an RRC connection setup message, an RRC connection resume message, an RRC connection re-establishment request message, a MAC CE message and/or a different (e.g., type of) message. In some examples, the first node may enter the first state based upon activating the NOMA resource.

In some examples, a downlink NOMA (e.g., grant-free scheduling) resource is active in a first downlink NOMA resource activity 705 at subframe2 of frame0 until subframe5 of frame0. Alternatively and/or additionally, an uplink NOMA (e.g., grant-free scheduling) resource is active in a first uplink NOMA resource activity 720 at subframe6 of frame0 until subframe9 of frame0. In some examples, a start time 730 (e.g., of monitoring the search space) is based upon the first downlink NOMA resource activity 705 and/or the first uplink NOMA resource activity 720. For example, the start time 730 may be a specific number (e.g., eight) of subframes after the first downlink NOMA resource activity 705. Alternatively and/or additionally, the start time 730 may be a second specific number (e.g., four) of subframes after the first uplink NOMA resource activity 720.

In some examples, a monitoring interval 735 may be based upon the NOMA resource. For example, the monitoring interval 735 may be based upon an NOMA resource interval (e.g., a time length between the first downlink NOMA resource activity 705 and a second downlink NOMA resource activity 715 and/or a time length between the first uplink NOMA resource activity 720 and a second uplink NOMA resource activity 725). In some examples, the monitoring interval 735 may be equal to the NOMA resource interval. For example, the monitoring interval 735 and/or the NOMA resource interval may (e.g., both) be equal to 20 subframes. Accordingly, the first node may monitor the search space at a time between an uplink NOMA resource and a downlink NOMA resource.

In some examples, the first node may monitor the search space at (e.g., a time corresponding to) subframe7 of frame3. The first node and/or the second node may deactivate the NOMA resource at the subframe7 of frame3. In some examples, the NOMA resource is deactivated based upon a message received from the second node. In some examples, the message may be received at the subframe7 of frame3 and/or at a different time. In some examples, the message is an RRC connection setup message, an RRC connection resume message, an RRC connection re-establishment request message, a MAC CE message and/or a different (e.g., type of) message. In some examples, the first node may leave the first state (e.g., and/or enter the second state) based upon deactivating the NOMA resource. In some examples, a second monitoring interval of the second state may be based upon the monitoring interval 735. Alternatively and/or additionally, the second monitoring interval may not be based upon the monitoring interval 735. For example, the second monitoring interval may be equal to five subframes.

Figure 8:
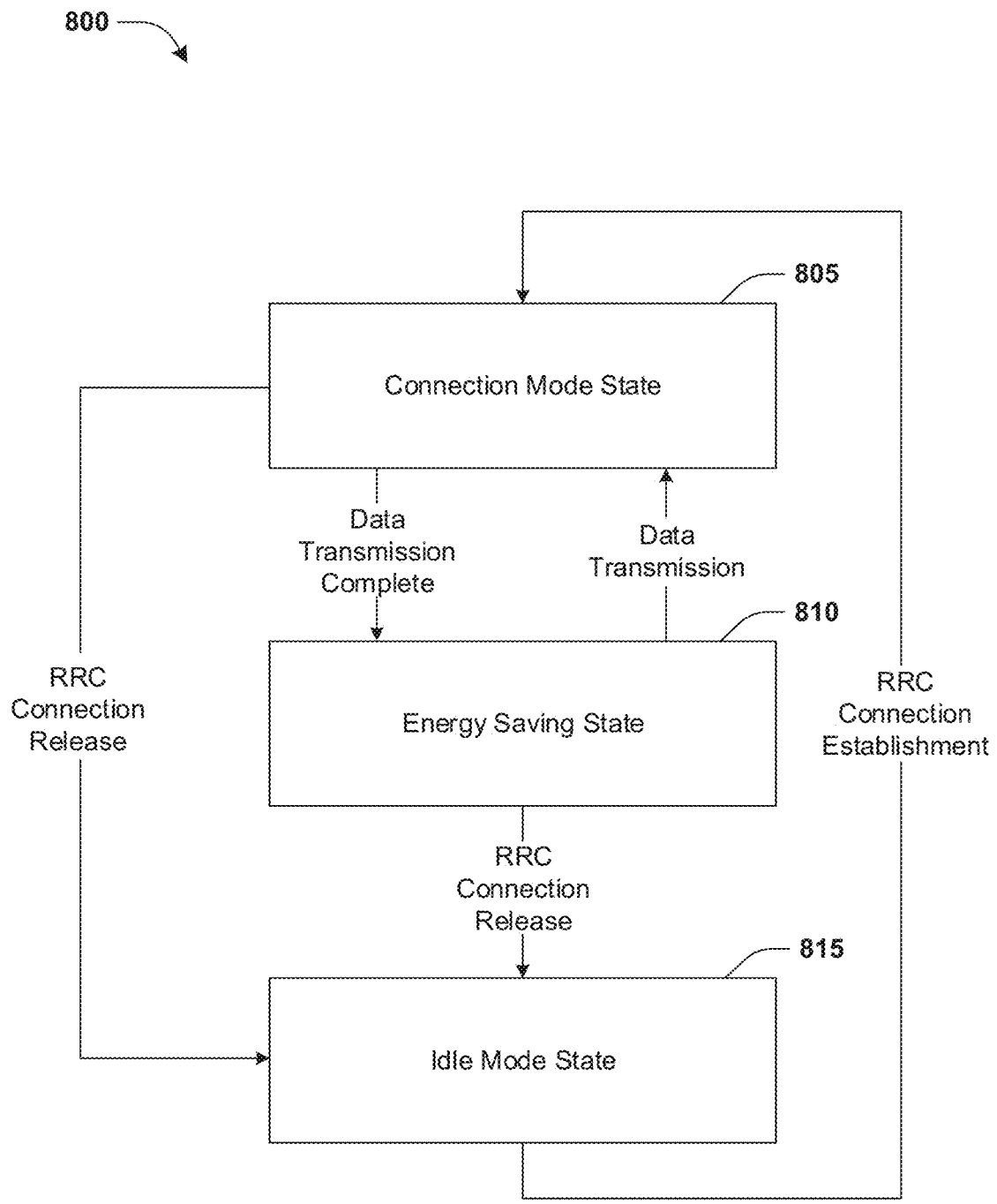
FIG. 8 is a diagram illustrating an example system for facilitating operation of a first node in a connection mode state, an energy saving state and/or an idle mode state.

FIG. 8 illustrates an example of a system 800 for facilitating operation of a first node in a connection mode state 805, an energy saving state 810 and/or an idle mode state 815. The first node may comprise a UE. In some examples, the first node may operate in the connection mode state 805. For example, the first node may perform data transmission with a second node (e.g., network and/or BS) in the connection mode state 805. The first node may enter the energy saving state 810 (e.g., from the connection mode state 805) responsive to a completion of the data transmission. In some examples, the completion of the data transmission may correspond to a time when data has been (e.g., completely) transmitted to the second node and/or (e.g., completely) received from the second node. Alternatively and/or additionally, the first node (e.g., and/or the second node) may start a timer responsive to the completion of the data transmission. The first node may enter the energy saving state 810 (e.g., from the connection mode state 805) responsive to a timeout of the timer. The timer may timeout responsive to the first node performing no data transmission for a specified time length.

Alternatively and/or additionally, the first node (e.g., and/or the second node) may initiate (e.g., and/or trigger) an RRC connection release procedure in the connection mode state 805. The RRC connection release procedure may be initiated (e.g., and/or triggered) responsive to the completion of the data transmission. In some examples, the first node may enter the idle mode state 815 (e.g., from the connection mode state 805) responsive to releasing the RRC connection.

In some examples, the first node (e.g., and/or the second node) may have a demand to perform second data transmission in the energy saving state 810. The first node may enter the connection mode state 805 (e.g., from the energy saving state 810) based upon the demand to perform the second data transmission. Alternatively and/or additionally, the first node (e.g., and/or the second node) may initiate (e.g., and/or trigger) an RRC connection release procedure in the energy saving state 810. The RRC connection release procedure may be initiated (e.g., and/or triggered) responsive to having no demand to perform data transmission. In some examples, the first node may enter the idle mode state 815 (e.g., from the energy saving state 810) responsive to releasing the RRC connection.

In some examples, the first node may initiate (e.g., and/or trigger) an RRC connection establishment procedure in the idle mode state 815. The RRC connection establishment procedure may be initiated (e.g., and/or triggered) responsive to a demand to perform third data transmission. In some examples, the first node may enter the connection mode state 805 (e.g., from the idle mode state 815) responsive to establishing the RRC connection.

Figure 9:
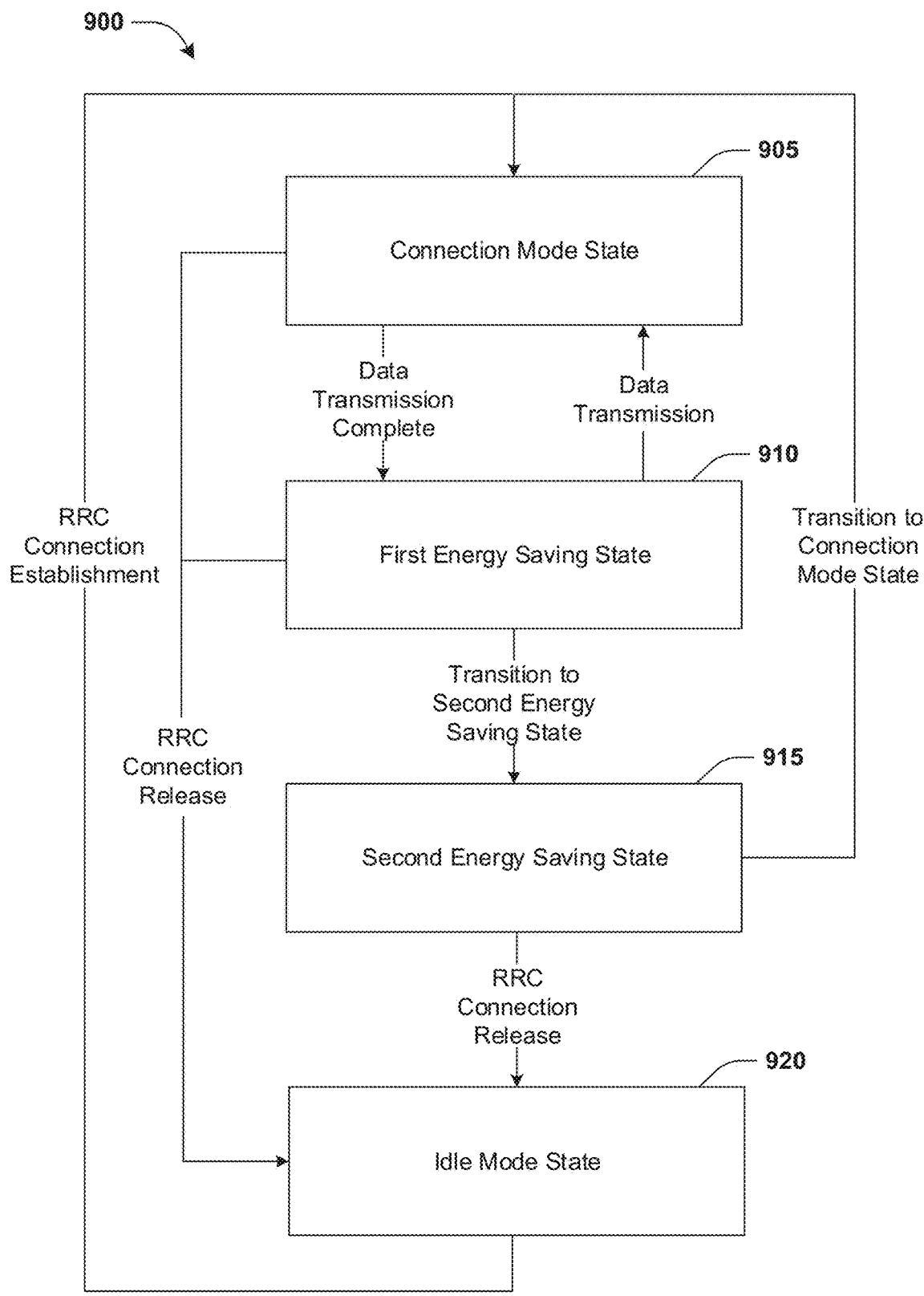
FIG. 9 is a diagram illustrating an example system for facilitating operation of a first node in a connection mode state, a first energy saving state, a second energy saving state and/or an idle mode state.

FIG. 9 illustrates an example of a system 900 for facilitating operation of a first node in a connection mode state 905, a first energy saving state 910, a second energy saving state 915 and/or an idle mode state 920. The first node may comprise a UE. In some examples, the first node may operate in the connection mode state 905. For example, the first node may perform data transmission with a second node (e.g., network and/or BS) in the connection mode state 905. The first node may enter the first energy saving state 910 (e.g., from the connection mode state 905) responsive to a completion of the data transmission. In some examples, the completion of the data transmission may correspond to a time when data has been (e.g., completely) transmitted to the second node and/or (e.g., completely) received from the second node. Alternatively and/or additionally, the first node (e.g., and/or the second node) may start a timer responsive to the completion of the data transmission. The first node may enter the first energy saving state 910 (e.g., from the connection mode state 905) responsive to a timeout of the timer. The timer may timeout responsive to the first node performing no data transmission for a specified time length. Alternatively and/or additionally, the first node (e.g., and/or the second node) may initiate (e.g., and/or trigger) an RRC connection release procedure in the connection mode state 905. The RRC connection release procedure may be initiated (e.g., and/or triggered) responsive to the completion of the data transmission. In some examples, the first node may enter the idle mode state 920 (e.g., from the connection mode state 905) responsive to releasing the RRC connection.

In some examples, the first node (e.g., and/or the second node) may have a demand to perform second data transmission in the first energy saving state 910. The first node may enter the connection mode state 905 (e.g., from the first energy saving state 910) based upon the demand to perform the second data transmission. Alternatively and/or additionally, the first node (e.g., and/or the second node) may initiate (e.g., and/or trigger) an RRC connection release procedure in the first energy saving state 910. The RRC connection release procedure may be initiated (e.g., and/or triggered) responsive to having no demand to perform data transmission. In some examples, the first node may enter the idle mode state 920 (e.g., from the first energy saving state 910) responsive to releasing the RRC connection.

In some examples, the first node may enter the second energy saving state 915 (e.g., from the first energy saving state 910) based upon one or more (e.g., trigger) conditions. The first node (e.g., and/or the second node) may start a second timer (e.g., responsive to the completion of the data transmission and/or responsive to entering the first energy saving state 910). In some examples, the first node may enter the second energy saving state 915 (e.g., from the first energy saving state 910) responsive to a timeout of the second timer. The second timer may timeout responsive to the first node performing no data transmission for a second specified time length. Alternatively and/or additionally, the first node may enter the second energy saving state 915 (e.g., from the first energy saving state 910) responsive to determining that (e.g., an amount of) data traffic (e.g., data transmission) (e.g., between the first node and the second node) is below (e.g., and/or above) a traffic threshold. Alternatively and/or additionally, the first node may enter the second energy saving state 915 (e.g., from the first energy saving state 910) responsive to a trigger (e.g., configured by the first node and/or the second node). Alternatively and/or additionally, the first node may enter the second energy saving state 915 (e.g., from the first energy saving state 910) based upon a message (e.g., received from the second node). In some examples, the message may be an RRC message.

In some examples, the first node may enter the connection mode state 905 (e.g., from the second energy saving state 915) based upon one or more (e.g., trigger) conditions. For example, the first node may enter the connection mode state 905 (e.g., from the second energy saving state 915) responsive to determining that (e.g., an amount of) data traffic (e.g., data transmission between the first node and the second node) is above (e.g., and/or below) a second traffic threshold (e.g., and/or the traffic threshold). Alternatively and/or additionally, the first node may enter the connection mode state 905 (e.g., from the second energy saving state 915) responsive to a trigger (e.g., configured by the first node and/or the second node). Alternatively and/or additionally, the first node may enter the connection mode state 905 (e.g., from the second energy saving state 915) based upon a message (e.g., received from the second node). In some examples, the message may be an RRC message.

Alternatively and/or additionally, the first node (e.g., and/or the second node) may initiate (e.g., and/or trigger) an RRC connection release procedure in the second energy saving state 915. The RRC connection release procedure may be initiated (e.g., and/or triggered) responsive to having no demand to perform data transmission. In some examples, the first node may enter the idle mode state 920 (e.g., from the second energy saving state 915) responsive to releasing the RRC connection.

In some examples, the first node may initiate (e.g., and/or trigger) an RRC connection establishment procedure in the idle mode state 920. The RRC connection establishment procedure may be initiated (e.g., and/or triggered) based upon a demand to perform third data transmission. In some examples, the first node may enter the connection mode state 905 (e.g., from the idle mode state 920) responsive to establishing the RRC connection.

Figure 10:
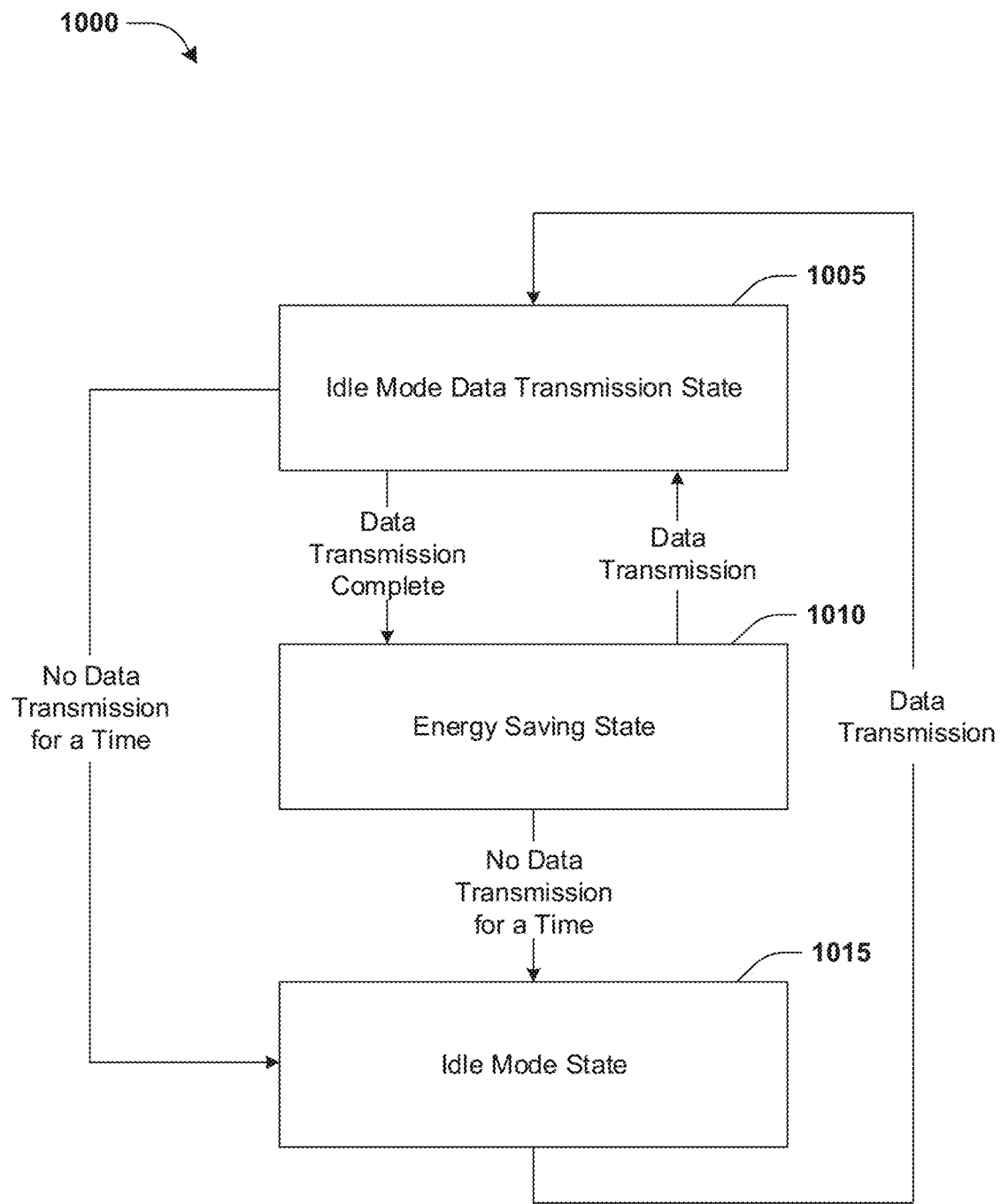
FIG. 10 is a diagram illustrating an example system for facilitating operation of a first node in an idle mode data transmission state, an energy saving state and/or an idle mode state.

FIG. 10 illustrates an example of a system 1000 for facilitating operation of a first node in an idle mode data transmission state 1005, an energy saving state 1010 and/or an idle mode state 1015. The first node may comprise a UE. In some examples, the first node may operate in the idle mode data transmission state 1005. For example, the first node may perform data transmission with a second node (e.g., network and/or BS) in the idle mode data transmission state 1005. The first node may enter the energy saving state 1010 (e.g., from the idle mode data transmission state 1005) responsive to a completion of the data transmission. In some examples, the completion of the data transmission may correspond to a time when data has been (e.g., completely) transmitted to the second node and/or (e.g., completely) received from the second node. Alternatively and/or additionally, the first node (e.g., and/or the second node) may start a timer responsive to the completion of the data transmission. The first node may enter the energy saving state 1010 (e.g., from the idle mode data transmission state 1005) responsive to a timeout of the timer. The timer may timeout responsive to the first node performing no data transmission for a specified time length.

Alternatively and/or additionally, the first node (e.g., and/or the second node) may start a second timer responsive to the completion of the data transmission. The first node may enter the idle mode state 1015 (e.g., from the idle mode data transmission state 1005) responsive to a timeout of the second timer. The second timer may timeout responsive to the first node performing no data transmission for a second specified time length.

In some examples, the first node (e.g., and/or the second node) may have a demand to perform second data transmission in the energy saving state 1010. The first node may enter the idle mode data transmission state 1005 (e.g., from the energy saving state 1010) based upon the demand to perform the second data transmission.

Alternatively and/or additionally, the first node (e.g., and/or the second node) may start a third timer (e.g., responsive to the completion of the data transmission and/or responsive to entering the energy saving state 1010). The first node may enter the idle mode state 1015 (e.g., from the energy saving state 1010) responsive to a timeout of the third timer. The third timer may timeout responsive to the first node performing no data transmission for a third specified time length.

Alternatively and/or additionally, the first node may enter the idle mode state 1015 (e.g., from the energy saving state 1010) responsive to a trigger (e.g., configured by the first node and/or the second node). Alternatively and/or additionally, the first node may enter the idle mode state 1015 (e.g., from the energy saving state 1010) based upon a message (e.g., received from the second node and/or received from an eNodeB). In some examples, the message may be a MAC CE message. In some examples, the message may be an RRC message. In some examples, the message may be an SIB.

In some examples, the first node (e.g., and/or the second node) may have a demand to perform third data transmission in the idle mode state 1015. The first node may enter the idle mode data transmission state 1005 (e.g., from the idle mode state 1015) based upon the demand to perform the third data transmission.

Figure 11:
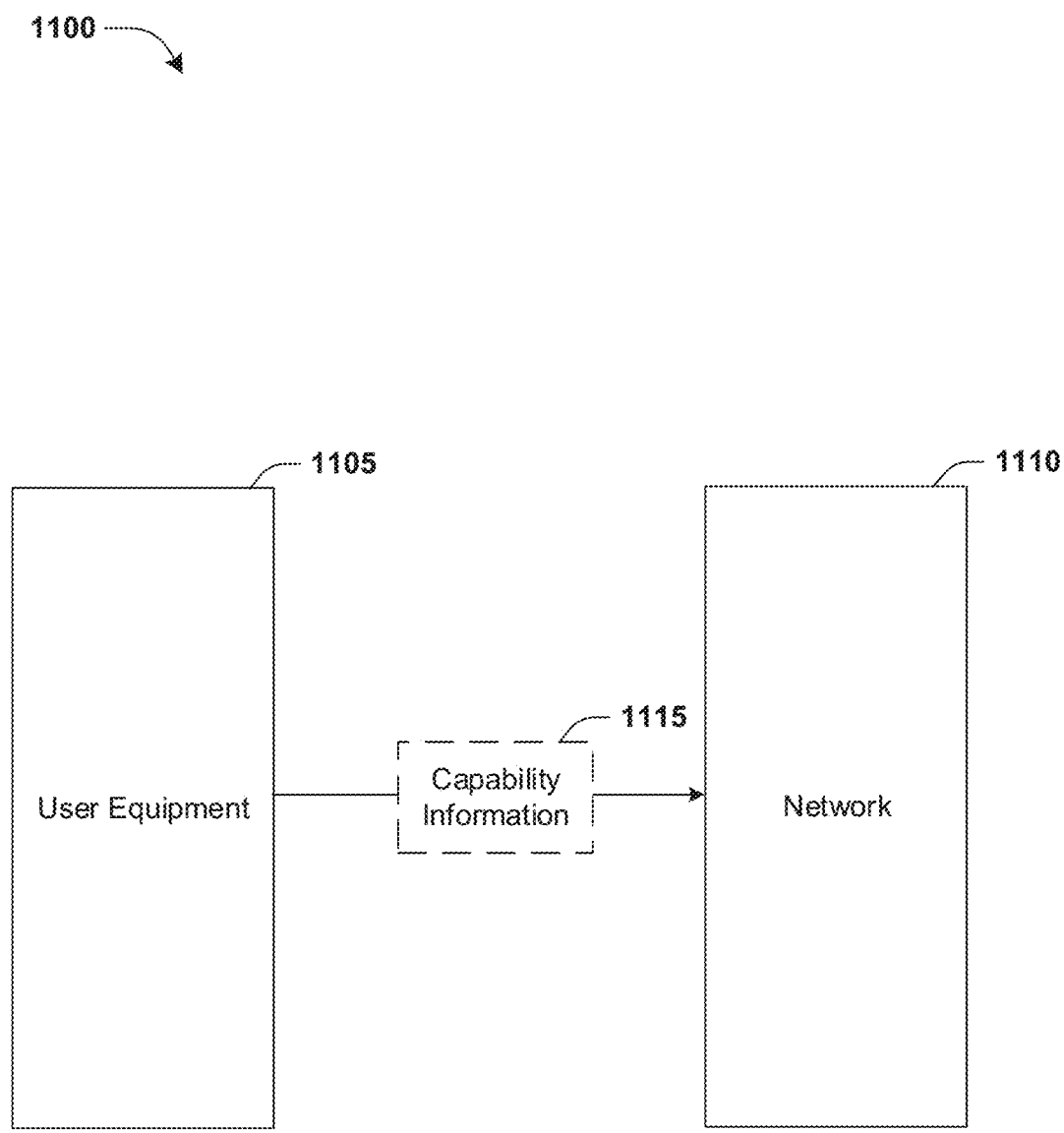
FIG. 11 is a diagram illustrating an example system for transmission of capability information from a first node to a second node.

FIG. 11 illustrates an example of a system 1100 for transmission of capability information 1115 from a first node 1105 to a second node 1110. In some examples, the first node 1105 may comprise a UE. Alternatively and/or additionally, the second node 1110 may comprise a network and/or a BS. Alternatively and/or additionally, the second node 1110 may comprise an eNodeB. In some examples, a configuration of a state of the first node 1105 may be based upon the capability information 1115. The state may be an energy saving state. The capability information 1115 may comprise communication capabilities of the first node 1105 in the state (e.g., related to communication between the first node 1105 and the second node 1110, in the state). In some examples, the first node 1105 may receive a request message (e.g., an RRC connection request message, an RRC connection resume request message, an RRC re-establishment request message, a MAC CE message, etc.) (e.g., from the second node 1110).

In some examples, the capability information 1115 comprises an NOMA support capability indication, a state related parameter support capability indication, a state support capability indication and/or (e.g., other) related information. The first node 1105 may transmit the capability information 1115 to the second node 1110 (e.g., based upon the request message). In some examples, the capability information 1115 may be transmitted within a MAC CE message. Alternatively and/or additionally, the capability information may be transmitted within an RRC message.

Figure 12:
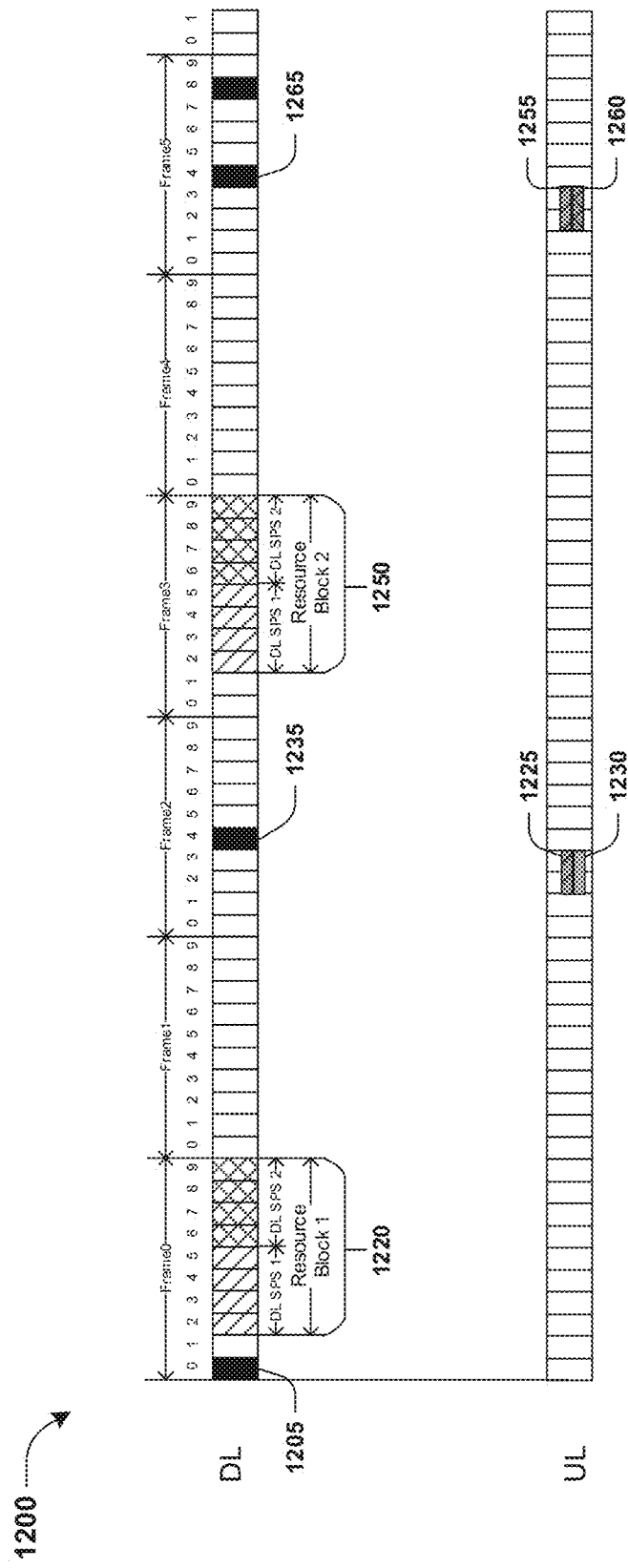
FIG. 12 is a diagram illustrating an example system for facilitating activation of an SPS resource.

FIG. 12 illustrates an example of a system 1200 for facilitating activation of an SPS resource. In some examples, the system 1200 may be based upon an LPWAN standard. Alternatively and/or additionally, the system 1200 may comprise an NB-IoT system. Alternatively and/or additionally, the system 1200 may comprise an NR system. In some examples, the system 1200 comprises an HARQ system. In some examples, a first node may comprise a UE. In some examples, the first node may monitor a search space. In some examples, the search space may comprise a USS and/or a CSS. In some examples, the search space may be based upon the SPS resource. In some examples, the search space may comprise one or more PDCCHs.

The first node may monitor the search space at a first monitoring instance 1205 at subframe0 of frame0. The first node may receive a first message at the first monitoring instance 1205, from a second node (e.g., network and/or BS). The first message may be transmitted by the second node to the first node using a PDCCH. In some examples, the first message may be formatted with a DCI format. Alternatively and/or additionally, the first message may comprise an RRC message. Alternatively and/or additionally, the first message may comprise a MAC CE message. Alternatively and/or additionally, the first message may comprise an SIB. In some examples, the first message may comprise an activation instruction. Accordingly, the first node may activate one or more downlink SPS resources responsive to receiving the first message. The one or more downlink SPS resources may correspond to one or more HARQ processes. In some examples, the one or more downlink SPS resources may comprise one or more PDSCH SPS resources and/or one or more NPDSCH SPS resources.

In some examples, the first node may determine a configuration based upon the first message (e.g., and/or responsive to activation of the one or more downlink SPS resources). For example, the first node may determine a downlink SPS resource location, a downlink SPS resource start time, a downlink SPS resource interval, a monitoring location, a monitoring start time 1235, a monitoring (e.g., maximum) number of repetitions and/or a monitoring interval.

The downlink SPS resource start time may be subframe2 of frame0. The first node may use a first downlink SPS resource at the subframe2 of frame0 until subframe5 of frame0. In some examples, the first downlink SPS resource is a first HARQ SPS resource. In some examples, the system 1200 comprises downlink SPS resource binding transmission. Accordingly, a number of downlink SPS resources (e.g., corresponding to HARQ processes) may be greater than one (e.g., two, three, four, etc.). The first node may use a (e.g., consecutive) second downlink SPS resource at subframe6 of frame0 until subframe9 of frame0. In some examples, the second downlink SPS resource is a second HARQ SPS resource.

In some examples, the monitoring number of repetitions may be determined based upon a time length of the first node (e.g., continuously) using the first downlink SPS resource (e.g., four subframes). Alternatively and/or additionally, the monitoring number of repetitions may be based upon a combination (e.g., multiplication, division, addition, subtraction, etc.) of a number and the time length of the first node (e.g., continuously) using the first downlink SPS resource. For example, the monitoring number of repetitions may be equal to one.

The first node may use the first downlink SPS resource and/or the second downlink SPS resource within a first resource block 1220. The first node may receive first information using the first downlink SPS resource within the first resource block 1220. Alternatively and/or additionally, the first node may receive second information using the second downlink SPS resource within the first resource block 1220. The first node may use the first downlink SPS resource (e.g., at subframe2 of frame3 until subframe5 of frame3) and/or the second downlink SPS resource (e.g., at subframe6 of frame3 until subframe9 of frame3) within a second resource block 1250.

In some examples, the first node may transmit an acknowledge indication 1225, to the second node (e.g., and/or to an eNodeB), based upon the first information. In some examples, the second information may have an error. The first node may transmit a non-acknowledge indication 1230, to the second node (e.g., and/or the eNodeB), based upon the second information. The acknowledge indication 1225 and/or the non-acknowledge indication 1230 may be transmitted at a first HARQ time at subframe2 of frame2 until subframe3 of frame 2. The first HARQ time may be based upon the first resource block 1220. For example, the first HARQ time may begin a specific time length (e.g., 13 subframes) after (e.g., the end of) the first resource block 1220 (e.g., the subframe9 of frame0).

The monitoring start time 1235 may be based upon the first resource block 1220. In some examples, the monitoring start time 1235 may be based upon the first resource block 1220. For example, the monitoring start time 1235 may begin a second specific time length (e.g., 15 subframes) after (e.g., the end of) the first resource block 1220 (e.g., the subframe9 of frame0). Alternatively and/or additionally, the monitoring start time 1235 may be based upon the first HARQ time. For example, the monitoring start time 1235 may begin a third specific time length (e.g., 1 subframe) after the first HARQ time (e.g., the subframe3 of frame2).

The downlink SPS resource interval may be based upon the first resource block 1220 and/or the second resource block 1250. For example, the downlink SPS resource interval may be based upon a time length between a beginning of the first resource block 1220 (e.g., the subframe2 of frame0) and a beginning of the second resource block 1250 (e.g., the subframe2 of frame3). Alternatively and/or additionally, the downlink SPS resource interval may be based upon a time length between an end of the first resource block 1220 (e.g., the subframe9 of frame0) and a beginning of the second resource block 1250 (e.g., the subframe2 of frame3).

In some examples, the monitoring interval may be based upon the downlink SPS resource interval. The monitoring interval may be based upon a combination (e.g., multiplication, division, addition, subtraction, etc.) of a number and the downlink SPS resource interval. For example, the monitoring interval may be equal to the downlink SPS resource interval (e.g., 30 subframes).

The first node may receive third information from the second node (e.g., and/or the eNodeB), based upon the acknowledge indication 1225, using the first downlink SPS resource within the second resource block 1220. The first node may receive a retransmission of (e.g., and/or a second representation of) the second information from the second node (e.g., and/or the eNodeB), based upon the non-acknowledge indication 1230, using the second downlink SPS resource within the second resource block 1220.

Alternatively and/or additionally, the first node may receive a second message at the monitoring start time 1235 (the subframe4 of frame5). In some examples, the second message may comprise instructions (e.g., formatted with a DCI format) corresponding to the third information and/or the fourth information. Accordingly, the first node may receive the third information from the second node based upon the second message. Alternatively and/or additionally, the first node may receive the retransmission of the second information, from the second node, based upon the second message.

In some examples, the first node may transmit a first acknowledge indication 1255, to the second node (e.g., and/or the eNodeB), based upon the third information. The first node may transmit a second acknowledge indication 1260, to the second node (e.g., and/or the eNodeB), based upon the retransmission of the second information. The acknowledge indication 1225 and/or the non-acknowledge indication 1230 may be transmitted at a second HARQ time at subframe2 of frame2 until subframe3 of frame 2. The second HARQ time may be based upon the second resource block 1250. For example, the second HARQ time may begin a specific time length (e.g., 13 subframes) after (e.g., the end of) the second resource block 1250 (e.g., the subframe9 of frame3).

In some examples, the first node may monitor the search space at a monitoring instance 1265 (e.g., subframe4 of frame5). The monitoring instance 1265 may be based upon the second resource block 1250. For example, the monitoring instance 1265 may begin a specific time length (e.g., 15 subframes) after (e.g., the end of) the second resource block 1250 (e.g., the subframe9 of frame3). Alternatively and/or additionally, the monitoring instance 1265 may be based upon the monitoring start time 1235 and/or the monitoring interval. For example, the monitoring instance 1265 (e.g., the subframe4 of frame5) may be based upon a combination (e.g., addition) of the monitoring interval (e.g., 30 subframes) to the monitoring start time 1235 (e.g., the subframe4 of frame2). Alternatively and/or additionally, the monitoring instance 1265 may be based upon the second HARQ time. For example, the monitoring instance 1265 may begin a specific time length (e.g., 1 subframe) after (e.g., the end of) the second HARQ time (e.g., the subframe3 of frame5).

In some examples, the first node may receive a third message, from the second node, at the monitoring instance 1265. The third message may comprise a deactivation instruction. Accordingly, the first node may deactivate the one or more downlink SPS resources (e.g., comprising the first downlink SPS resource and/or the second downlink SPS resource) responsive to receiving the third message. The monitoring number of repetitions may change to a second monitoring number of repetitions (e.g., 1 subframe) (e.g., and/or stay the same) and/or the monitoring interval may change to a second monitoring interval (e.g., 3 subframes) (e.g., and/or stay the same). In some examples, the search space may change to a second search space (e.g., and/or stay the same).

In some examples, the first message (e.g., comprising the activation instruction) may be formatted with a DCI format (e.g., format 0, format 1, format 1A, etc.). Alternatively and/or additionally, the first message may comprise an RRC message. Alternatively and/or additionally, the first message may comprise a MAC CE message. Alternatively and/or additionally, the first message may comprise an SIB. In some examples, the first message may comprise one or more contents (e.g., based upon an indication field) corresponding to the PDCCH and/or the one or more downlink SPS resources. The one or more contents may comprise a domain, a scheduling delay, a resource assignment, a modulation and coding scheme, a repetition number, a new data indicator, an HARQ-ACK resource (e.g., location), a DCI subframe repetition number and/or an HARQ process number. In some examples, (e.g., a scope of) the first message (e.g., and/or the one or more contents) may (e.g., be extended to) comprise one or more additional contents corresponding to (e.g., activation of) the one or more downlink SPS resources and/or configured to support the one or more downlink SPS resources and/or the one or more HARQ processes. The one or more additional contents may comprise an extended HARQ process number (e.g., corresponding to a supported number of HARQ processes), a downlink SPS activation indication (e.g., configured to trigger activation of the one or more downlink SPS resources), the downlink SPS resource (e.g., block) interval, (e.g., corresponding to an interval between the first resource block 1220 and the second resource block 1250), a difference between PDCCH (e.g., monitoring) and downlink SPS resource blocks (e.g., corresponding to an interval between the monitoring start time 1235 and the first resource block 1220 and/or an interval between a monitoring instance and a preceding resource block) and/or the (e.g., maximum) number of PDCCH (e.g., monitoring) repetitions (e.g., corresponding to the maximum number of repetitions). Alternatively and/or additionally, the supported number of HARQ processes may be determined based upon the HARQ process number and/or the extended HARQ process number. For example, the supported number of HARQ processes may be equal to the extended HARQ process number. Alternatively and/or additionally, the supported number of HARQ processes may be equal to a combination (e.g., addition) of the HARQ process number, one and/or the extended HARQ process number. Alternatively and/or additionally, the supported number of HARQ processes may be equal to a combination (e.g., addition) of the extended HARQ process number and two.

In some examples, the third message (e.g., comprising the deactivation instruction) may be formatted with a DCI format (e.g., format 0, format 1, format 1A, etc.). Alternatively and/or additionally, the third message may comprise an RRC message. Alternatively and/or additionally, the third message may comprise a MAC CE message. Alternatively and/or additionally, the third message may comprise an SIB. In some examples, the third message may comprise one or more contents (e.g., based upon an indication field) corresponding to the PDCCH and/or the one or more downlink SPS resources. The one or more contents may comprise a domain, a scheduling delay, a resource assignment, a modulation and coding scheme, a repetition number, a new data indicator, an HARQ-ACK resource (e.g., location), a DCI subframe repetition number, a HARQ process number and/or an extended HARQ process number. Alternatively and/or additionally, the domain may correspond to a predefined indication value. In some examples, (e.g., a scope of) the third message (e.g., and/or the one or more contents) may (e.g., be extended to) comprise one or more additional contents corresponding to (e.g., deactivation of) the one or more downlink SPS resources and/or configured to support the one or more downlink SPS resources and/or the one or more HARQ processes.

Figure 13:
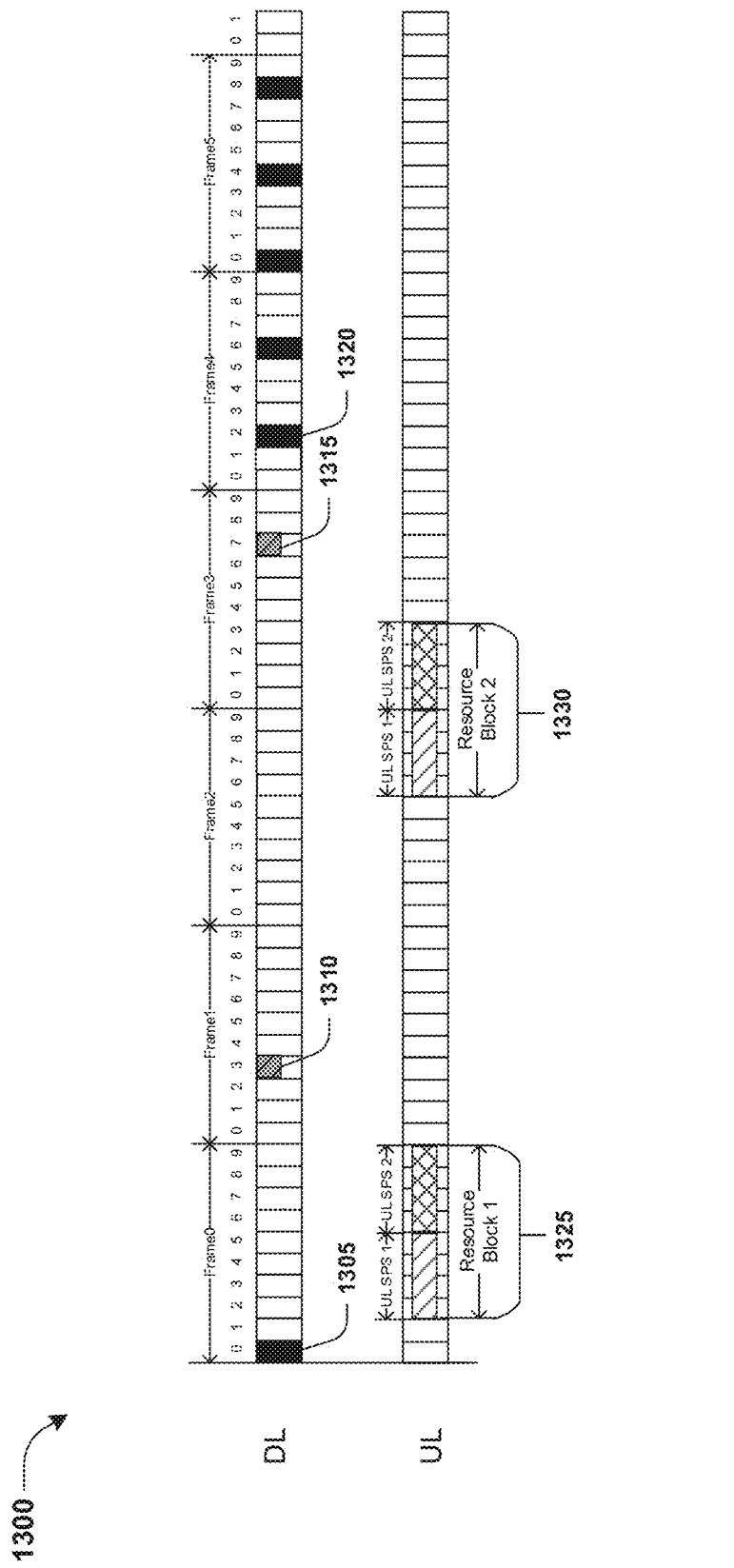
FIG. 13 is a diagram illustrating an example system for facilitating activation of an SPS resource.

FIG. 13 illustrates an example of a system 1300 for facilitating activation of an SPS resource. In some examples, the system 1300 may be based upon an LPWAN standard. Alternatively and/or additionally, the system 1300 may comprise an NB-IoT system. Alternatively and/or additionally, the system 1300 may comprise an NR system. In some examples, the system 1300 comprises an HARQ system. In some examples, a first node may comprise a UE. In some examples, the first node may monitor a search space. In some examples, the search space may comprise a USS and/or a CSS. In some examples, the search space may be based upon the SPS resource. In some examples, the search space may comprise one or more PDCCHs.

The first node may monitor the search space at a first monitoring instance 1305 at subframe0 of frame0. The first node may receive a first message at the first monitoring instance 1305, from a second node (e.g., network and/or BS). The first message may be transmitted by the second node to the first node using a PDCCH. In some examples, the first message may comprise an activation instruction. Accordingly, the first node may activate one or more uplink SPS resources responsive to receiving the first message. The one or more uplink SPS resources may correspond to one or more HARQ processes. In some examples, the one or more uplink SPS resources may comprise one or more physical uplink shared channel (PUSCH) SPS resources and/or one or more narrowband PUSCH (NPUSCH) SPS resources.

In some examples, the first node may determine a configuration based upon the first message (e.g., and/or responsive to activation of the one or more uplink SPS resources). For example, the first node may determine an uplink SPS resource location, an uplink SPS resource start time, an uplink SPS resource interval, a monitoring location, a monitoring start time 1310, a monitoring (e.g., maximum) number of repetitions and/or a monitoring interval.

The uplink SPS resource start time may be subframe2 of frame0. The first node may use a first uplink SPS resource at the subframe2 of frame0 until subframe5 of frame0. In some examples, the first uplink SPS resource is a first HARQ SPS resource. In some examples, the system 1300 comprises uplink SPS resource binding transmission. Accordingly, a number of uplink SPS resources (e.g., corresponding to HARQ processes) may be greater than one (e.g., two, three, four, etc.). The first node may use a (e.g., consecutive) uplink SPS resource at subframe6 of frame0 until subframe9 of frame0. In some examples, the second uplink SPS resource is a second HARQ SPS resource.

The first node may use the first uplink SPS resource and/or the second uplink SPS resource within a first resource block 1325. The first node may transmit first information to the second node using the first uplink SPS resource within the first resource block 1325. Alternatively and/or additionally, the first node may transmit second information to the second node using the second uplink SPS resource within the first resource block 1325. The first node may use the first uplink SPS resource (e.g., at subframe6 of frame1 until subframe9 of frame1) and/or the second uplink SPS resource (e.g., at subframe0 of frame2 until subframe3 of frame2) within a second resource block 1330.

The monitoring start time 1310 may be based upon the first resource block 1325. For example, the monitoring start time 1310 may begin a specific time length (e.g., 4 subframes) after (e.g., the end of) the first resource block 1325 (e.g., the subframe9 of frame0). In some examples, the first node may monitor the search space at the monitoring start time 1310. The first node may receive an acknowledge indication based upon the first information, from the second node (e.g., and/or an eNodeB), at the monitoring start time 1310. Alternatively and/or additionally, the first node may receive a non-acknowledge indication based upon the second information, from the second node (e.g., and/or the eNodeB), at the monitoring start time 1310. The acknowledge indication and/or the non-acknowledge indication may be transmitted by the second node to the first node using a PDCCH.

The acknowledge indication and/or the non-acknowledge indication may be comprised within a feedback message (e.g., received by the first node, from the second node, at the monitoring start time 1310). The feedback message may be formatted with a DCI format. The feedback message may comprise one or more contents (e.g., based upon an indication field) corresponding to the PDCCH and/or the feedback message. The one or more contents may comprise an uplink SPS retransmission feedback DCI indication field and/or a new data indicator corresponding to one or more HARQ processes. In some examples, the new data indicator comprising a new data indication (e.g., corresponding to the first information) may correspond to the acknowledge indication (e.g., based upon the first information). Alternatively and/or additionally, the new data indicator comprising a retransmission indication (e.g., corresponding to the second information) may correspond to the non-acknowledge indication (e.g., based upon the second information).

The first node may transmit third information to the second node using the first uplink SPS resource within the second resource block 1330, based upon the acknowledge indication. Alternatively and/or additionally, the first node may retransmit (e.g., transmit a second representation of) the second information to the second node using the second uplink SPS resource within the second resource block 1330, based upon the non-acknowledge indication. In some examples, the second resource block 1330 may be based upon the first resource block 1325 (e.g., the subframe2 of frame0) and/or the uplink SPS resource interval (e.g., 24 subframes).

The first node may monitor the search space at a third monitoring instance 1315. In some examples, the third monitoring instance 1315 may be based upon the monitoring start time 1310 (e.g., the subframe3 of frame1) and/or the monitoring interval (e.g., 24 subframes). Alternatively and/or additionally, the third monitoring instance 1315 may be based upon the second resource block 1330. For example, the third monitoring instance 1315 may begin a specific time length (e.g., 4 subframes) after (e.g., the end of) the second resource block 1330 (e.g., the subframe9 of frame2). The first node may receive a second acknowledge indication based upon the third information, from the second node (e.g., and/or an eNodeB), at the third monitoring instance 1315. Alternatively and/or additionally, the first node may receive a third acknowledge indication based upon (e.g., the second representation of) the second information, from the second node (e.g., and/or an eNodeB), at the third monitoring instance 1315. The second acknowledge indication and/or the third acknowledge indication may be transmitted by the second node to the first node using a PDCCH.

In some examples, the first node may receive a second message, from the second node, at the third monitoring instance 1315. The second message may comprise a deactivation instruction. Accordingly, the first node may deactivate the one or more uplink SPS resources (e.g., comprising the first uplink SPS resource and/or the second uplink SPS resource) responsive to receiving the second message. In some examples, the search space may change to a second search space (e.g., and/or stay the same).

In some examples, the first message (e.g., comprising the activation instruction) may be formatted with a DCI format (e.g., format 0, format 1, format 1A, etc.). Alternatively and/or additionally, the first message may comprise an RRC message. Alternatively and/or additionally, the first message may comprise a MAC CE message. Alternatively and/or additionally, the first message may comprise an SIB. In some examples, the first message may comprise one or more contents (e.g., based upon an indication field) corresponding to the PDCCH and/or the one or more uplink SPS resources. The one or more contents may comprise a domain, a sub-carrier indication, a resource assignment, a scheduling delay, a modulation and coding scheme, a redundancy version, a repetition number, a new data indicator and/or an HARQ process number. In some examples, (e.g., a scope of) the first message (e.g., and/or the one or more contents) may (e.g., be extended to) comprise one or more additional contents corresponding to (e.g., activation of) the one or more uplink SPS resources and/or configured to support the one or more uplink SPS resources and/or the one or more HARQ processes. The one or more additional contents may comprise an extended HARQ process number (e.g., corresponding to a supported number of HARQ processes), an uplink SPS activation indication (e.g., configured to trigger activation of the one or more uplink SPS resources), the uplink SPS resource (e.g., block) interval, (e.g., corresponding to an interval between the first resource block 1325 and the second resource block 1330), a difference between PDCCH (e.g., monitoring) and uplink SPS resource blocks (e.g., corresponding to an interval between the monitoring start time 1310 and the first resource block 1325 and/or an interval between a monitoring instance and a preceding resource block) and/or a (e.g., maximum) number of PDCCH (e.g., monitoring) repetitions (e.g., corresponding to the maximum number of repetitions). Alternatively and/or additionally, the supported number of HARQ processes may be determined based upon the HARQ process number and/or the extended HARQ process number. For example, the supported number of HARQ processes may be equal to the extended HARQ process number. Alternatively and/or additionally, the supported number of HARQ processes may be equal to a combination (e.g., addition) of the HARQ process number, one and/or the extended HARQ process number. Alternatively and/or additionally, the supported number of HARQ processes may be equal to a combination (e.g., addition) of the extended HARQ process number and two.

In some examples, the second message (e.g., comprising the deactivation instruction) may be formatted with a DCI format (e.g., format 0, format 1, format 1A, etc.). Alternatively and/or additionally, the second message may comprise an RRC message. Alternatively and/or additionally, the second message may comprise a MAC CE message. Alternatively and/or additionally, the second message may comprise an SIB. In some examples, the second message may comprise one or more contents (e.g., based upon an indication field) corresponding to the PDCCH and/or the one or more uplink SPS resources. The one or more contents may comprise a domain, a sub-carrier indication, a resource assignment, a scheduling delay, a modulation and coding scheme, a redundancy version, a repetition number, a new data indicator and/or an HARQ process number. Alternatively and/or additionally, the domain may correspond to a predefined indication value. In some examples, (e.g., a scope of) the second message (e.g., and/or the one or more contents) may (e.g., be extended to) comprise one or more additional contents corresponding to (e.g., deactivation of) the one or more uplink SPS resources and/or configured to support the one or more uplink SPS resources and/or the one or more HARQ processes.

Figure 14:
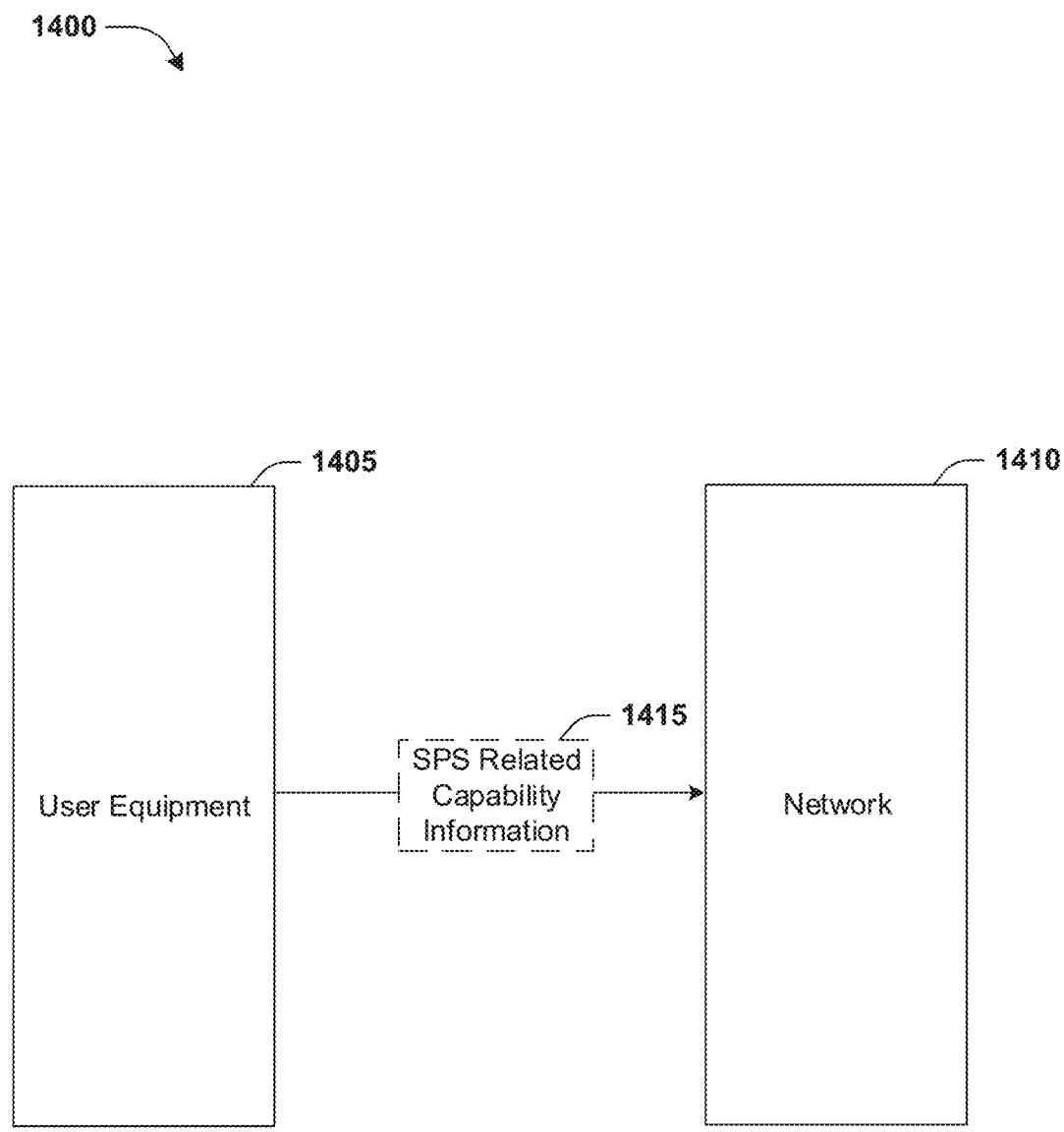
FIG. 14 is a component block diagram illustrating an example system for transmission of capability information from a first node to a second node.

FIG. 14 illustrates an example of a system 1400 for transmission of (e.g., SPS related) capability information 1415 from a first node 1405 to a second node 1410. In some examples, the first node 1405 may comprise a UE. Alternatively and/or additionally, the second node 1410 may comprise a network and/or a BS. For example, the second node 1410 may comprise an eNodeB. In some examples, a configuration corresponding to an SPS resource and/or an HARQ resource process may be based upon the capability information 1415. The capability information 1415 may comprise communication capabilities of the first node 1405 (e.g., with relation to the SPS resource and/or communication between the first node 1405 and the second node 1410). The capability information 1415 may comprise a maximum number of HARQ resources (e.g., corresponding to HARQ SPS processes) that the first node 1405 can support. In some examples, the first node 1405 may transmit a message (e.g., an NOMA support capability indication, a second state related parameter support capability indication, a second state support capability indication, etc.,) comprising the capability information 1415 to the second node 1410 (e.g., and/or to an eNodeB). In some examples, the message may comprise a MAC CE message. Alternatively and/or additionally, the message may comprise an RRC message.

Figure 15:
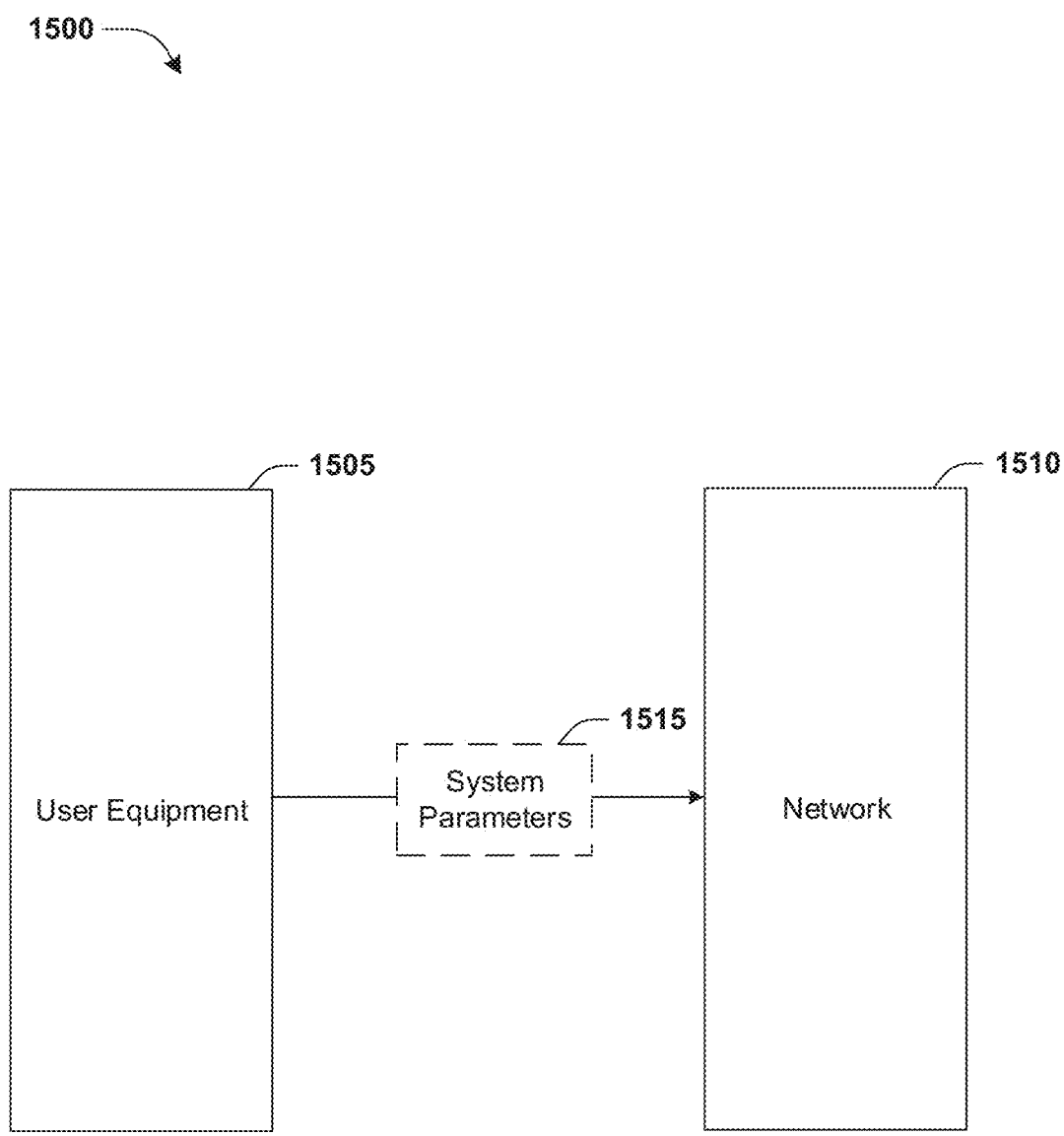
FIG. 15 is a component block diagram illustrating an example system for transmission of a system parameter message from a first node to a second node.

FIG. 15 illustrates an example of a system 1500 for transmission of a system parameter message 1515 from a first node 1505 to a second node 1510. In some examples, the first node 1505 may comprise a UE. Alternatively and/or additionally, the second node 1510 may comprise a network and/or a BS. For example, the second node 1510 may comprise an eNodeB. The system parameter message 1515 may comprise one or more service types and/or one or more service characteristics. In some examples, the one or more service types may comprise continuity of data transmission and/or a size of data. In some examples, the one or more service characteristics may comprise a QoS, a size of a transfer block, a cycle of service and/or a periodicity. In some examples, the system parameter message 1515 may be transmitted using UE-specific signaling and/or a Uu interface (e.g., LTE radio interface). In some examples, the system parameter message 1515 may comprise an RRC message.

Alternatively and/or additionally, the system parameter message 1515 may comprise a MAC CE message. The system parameter message 1515 (e.g., comprising the MAC CE message) may comprise a first logical channel group (LCG) identification (e.g., LCG ID1) (e.g., corresponding to continuity of data transmission and/or the size of data) and/or a second LCG identification (e.g., LCG ID2) (e.g., the periodicity, the size of a transfer block, the cycle of service, etc.).

Figure 16A:
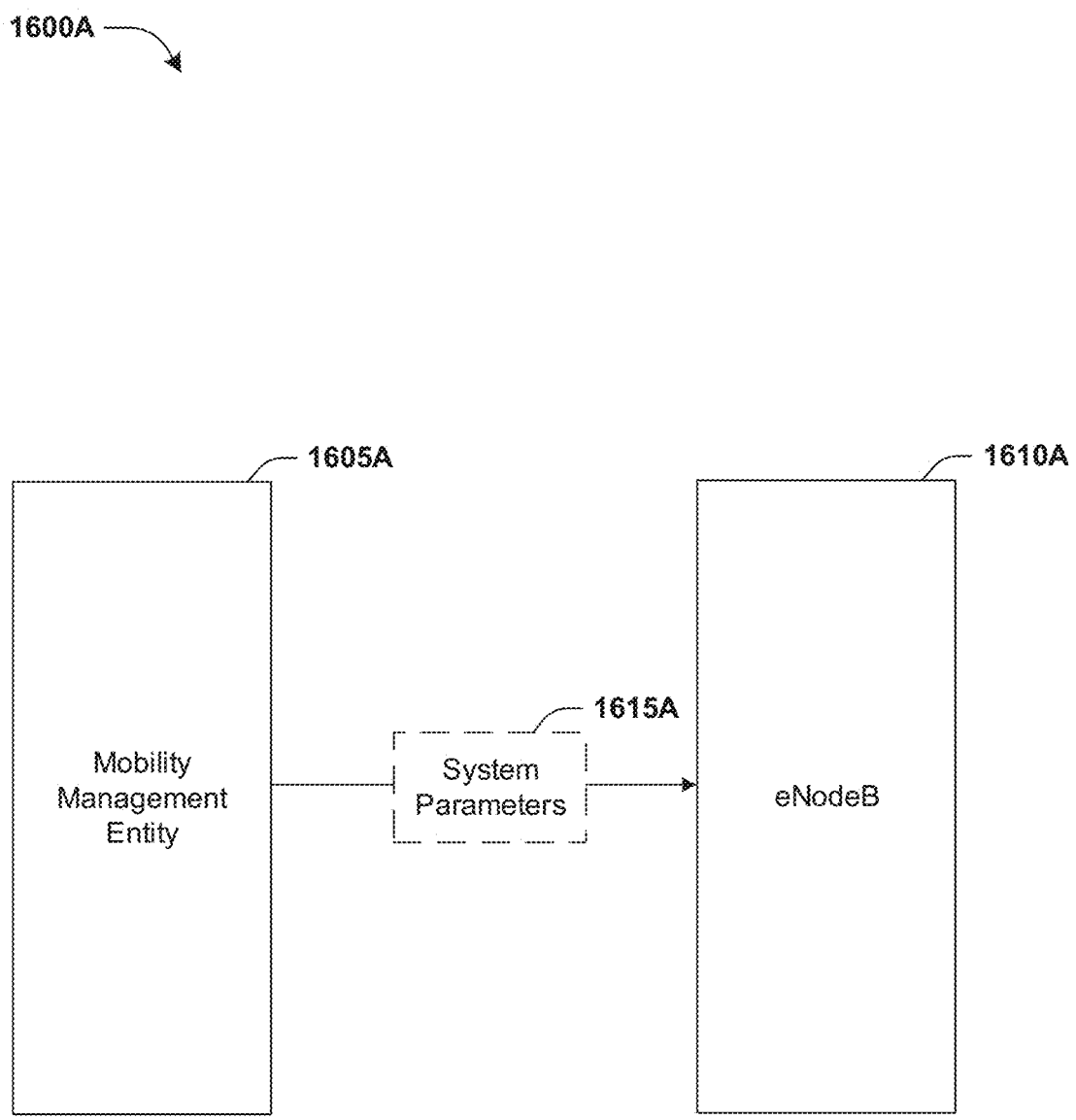
FIG. 16A is a component block diagram illustrating an example system for transmission of a system parameter message from a first node to a second node.

FIG. 16A illustrates an example of a system 1600A for transmission of a system parameter message 1615A from a first node 1605 (e.g., an MME) to a second node 1610A (e.g., an eNodeB). The system parameter message 1615A may comprise one or more service types and/or one or more service characteristics. In some examples, the system parameter message 1615A may be transmitted using an Si interface and/or an NG interface. In some examples, the system parameter message 1615A may comprise an S1AP message and/or an NGAP message comprising a specified QCI value indicative of the one or more service types and/or the one or more service characteristics. In some examples, the system parameter message 1615A may comprise an S1AP message and/or an NGAP message comprising one or more parameters corresponding to the one or more service types and/or one or more indications corresponding to the one or more service characteristics.

Figure 16B:
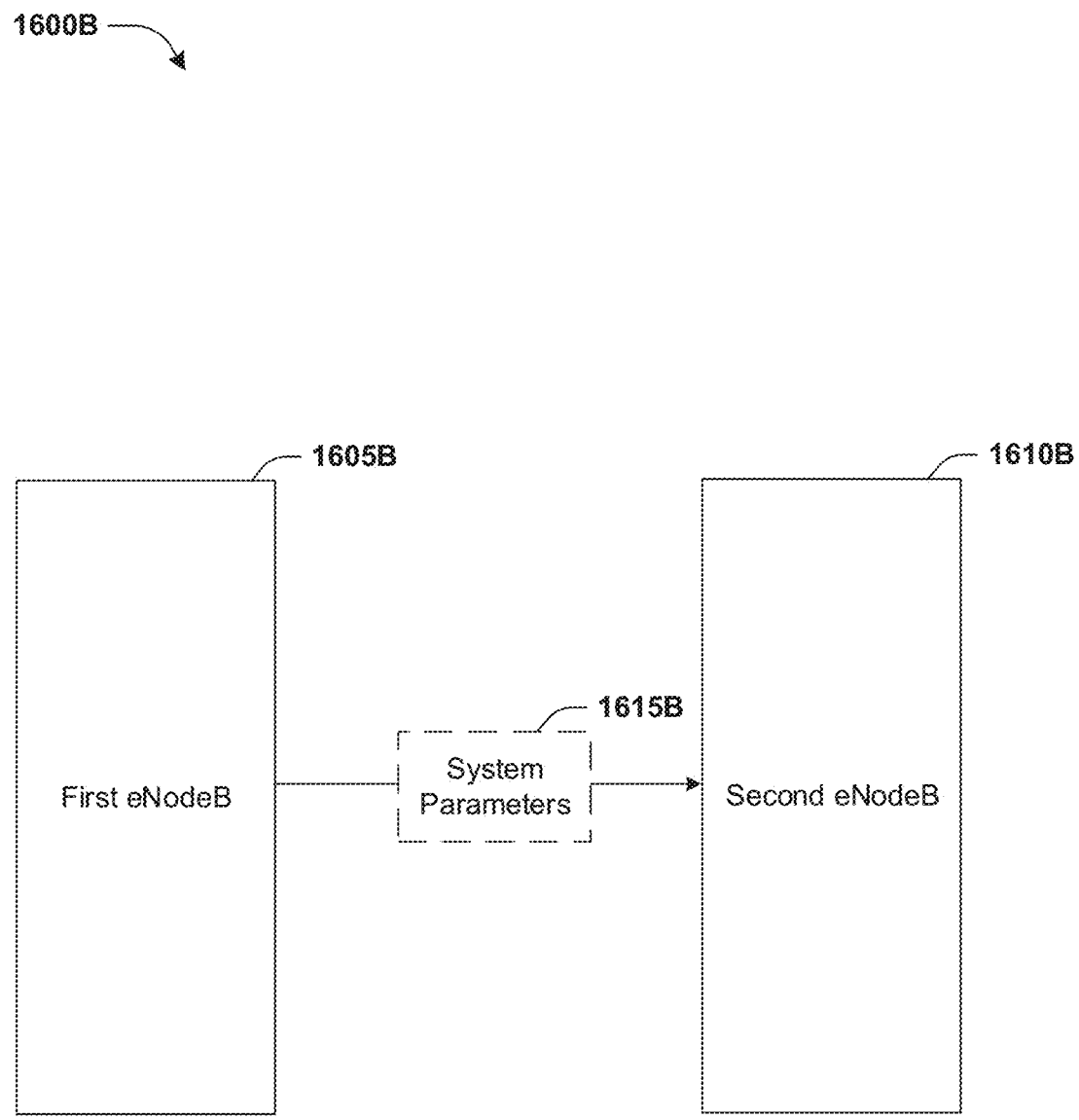
FIG. 16B is a component block diagram illustrating an example system for transmission of a system parameter message from a first node to a second node.

FIG. 16B illustrates an example of a system 1600B for transmission of a system parameter message 1615B from a first node 1605B (e.g., a first eNodeB) to a second node 1610B (e.g., a second eNodeB). The system parameter message 1615B may comprise one or more service types and/or one or more service characteristics. In some examples, the system parameter message 1615B may be transmitted using an X2 interface and/or an Xn interface. In some examples, the system parameter message 1615B may comprise an X2AP message and/or an Xn message including a specified QCI value to indicate the one or more service types and/or the one or more service characteristics. In some examples, the system parameter message 1615B may comprise an X2AP message and/or an XnAP message comprising one or more parameters corresponding to the one or more service types and/or one or more indications corresponding to the one or more service characteristics.

FIG. 17 illustrates a chart 1700 of an example of one or more downlink SPS resources. The chart 1700 may be applied to the system 1200 illustrated in FIG. 12 and/or one or more other systems disclosed and/or illustrated herein. In some examples, a feedback indication (an acknowledge indication and/or a non-acknowledge indication) may correspond to an HARQ process identification number (e.g., HARQ Process ID Number in the chart 1700). Alternatively and/or additionally, the HARQ process identification number may be based upon a downlink SPS resource corresponding to the feedback indication. For example, a first HARQ process identification number of a first feedback indication corresponding to a first downlink SPS resource may be equal to a specific number (e.g., 0). A second HARQ process identification number of a second feedback indication corresponding to a second downlink SPS resource may be equal to a combination (e.g., addition) of the specific number and one (e.g., one). In some examples, the first node may have a threshold number of feedback indications that may be transmitted at a (e.g., single) time. For example, the first node may transmit no more than four feedback indications at a first time (e.g., corresponding to k0=13). In some examples, the first node may transmit one or more feedback indications at a second time (e.g., corresponding to k0=15), responsive to exceeding the threshold number of feedback indications. In some examples, an HARQ process identification number (e.g., ACK/NACK resource position) may be determined based upon an ACK/NACK subcarrier number (e.g., frequency domain resource of ACK/NACK) and/or k0 (e.g., time occasion of ACK/NACK resource). In some examples, the ACK/NACK subcarrier number, the HARQ process identification number and/or k0 may be formatted with a DCI format. Alternatively and/or additionally, the ACK/NACK subcarrier number, the HARQ process identification number and/or k0 may comprise an RRC message. Alternatively and/or additionally, the ACK/NACK subcarrier number, the HARQ process identification number and/or k0 may comprise a MAC CE message.

Figure 18:
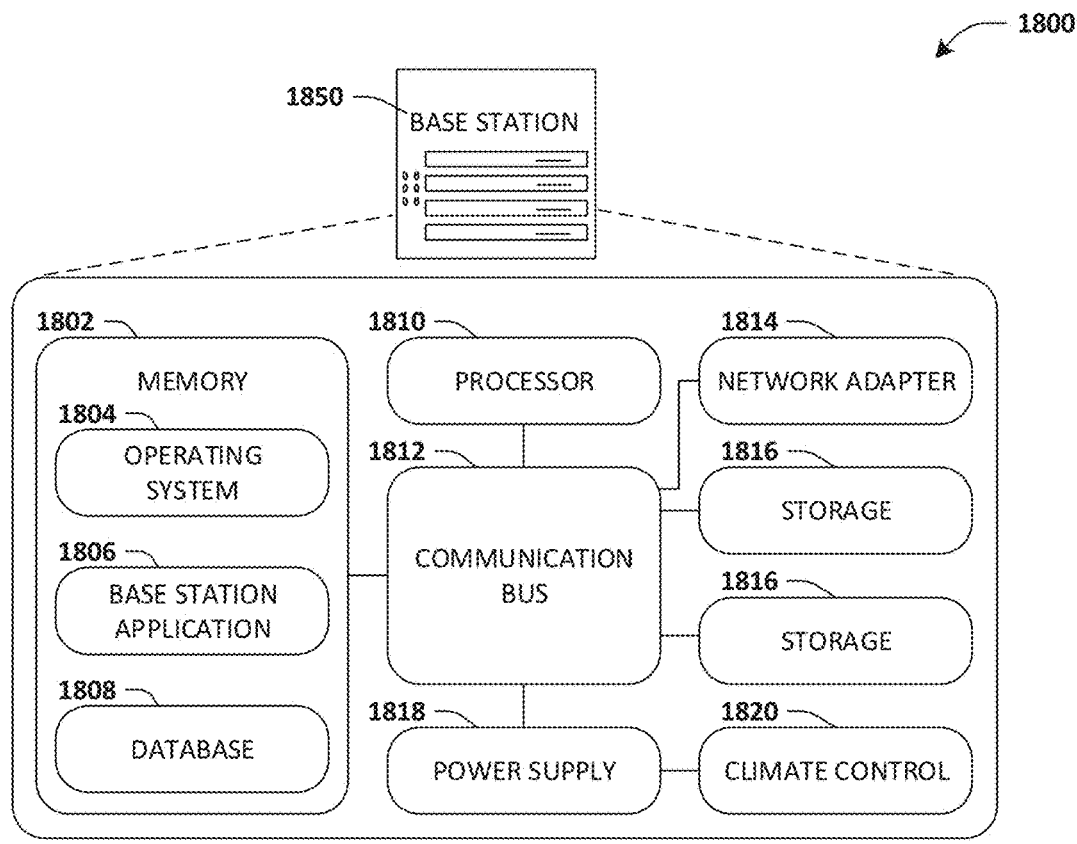
FIG. 18 is an illustration of a scenario involving an example configuration of a base station (BS) that may utilize and/or implement at least a portion of the techniques presented herein.

FIG. 18 presents a schematic architecture diagram 1800 of a base station 1850 (e.g., a node) that may utilize at least a portion of the techniques provided herein. Such a base station 1850 may vary widely in configuration and/or capabilities, alone or in conjunction with other base stations, nodes, end units and/or servers, etc. in order to provide a service, such as at least some of one or more of the other disclosed techniques, scenarios, etc. For example, the base station 1850 may connect one or more user equipment (UE) to a (e.g., wireless) network (e.g., which may be connected and/or include one or more other base stations), such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The network may implement a radio technology, such as Universal Terrestrial Radio Access (UTRA), CDMA13000, Global System for Mobile Communications (GSM), Evolved UTRA (E-UTRA), IEEE 802.11, IEEE 802.16, IEEE 802.20, Flash-OFDM, etc. The base station 1850 and/or the network may communicate using a standard, such as Long-Term Evolution (LTE).

The base station 1850 may comprise one or more (e.g., hardware) processors 1810 that process instructions. The one or more processors 1810 may optionally include a plurality of cores; one or more coprocessors, such as a mathematics coprocessor or an integrated graphical processing unit (GPU); and/or one or more layers of local cache memory. The base station 1850 may comprise memory 1802 storing various forms of applications, such as an operating system 1804; one or more base station applications 1806; and/or various forms of data, such as a database 1808 and/or a file system, etc. The base station 1850 may comprise a variety of peripheral components, such as a wired and/or wireless network adapter 1814 connectible to a local area network and/or wide area network; one or more storage components 1816, such as a hard disk drive, a solid-state storage device (SSD), a flash memory device, and/or a magnetic and/or optical disk reader; and/or other peripheral components.

The base station 1850 may comprise a mainboard featuring one or more communication buses 1812 that interconnect the processor 1810, the memory 1802, and/or various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 1812 may interconnect the base station 1850 with at least one other server. Other components that may optionally be included with the base station 1850 (though not shown in the schematic diagram 1800 of FIG. 18) include a display; a display adapter, such as a graphical processing unit (GPU); input peripherals, such as a keyboard and/or mouse; and/or a flash memory device that may store a basic input/output system (BIOS) routine that facilitates booting the base station 1850 to a state of readiness, etc.

The base station 1850 may operate in various physical enclosures, such as a desktop or tower, and/or may be integrated with a display as an "all-in-one" device. The base station 1850 may be mounted horizontally and/or in a cabinet or rack, and/or may simply comprise an interconnected set of components. The base station 1850 may comprise a dedicated and/or shared power supply 1818 that supplies and/or regulates power for the other components. The base station 1850 may provide power to and/or receive power from another base station and/or server and/or other devices. The base station 1850 may comprise a shared and/or dedicated climate control unit 1820 that regulates climate properties, such as temperature, humidity, and/or airflow. Many such base stations 1850 may be configured and/or adapted to utilize at least a portion of the techniques presented herein.

Figure 19:
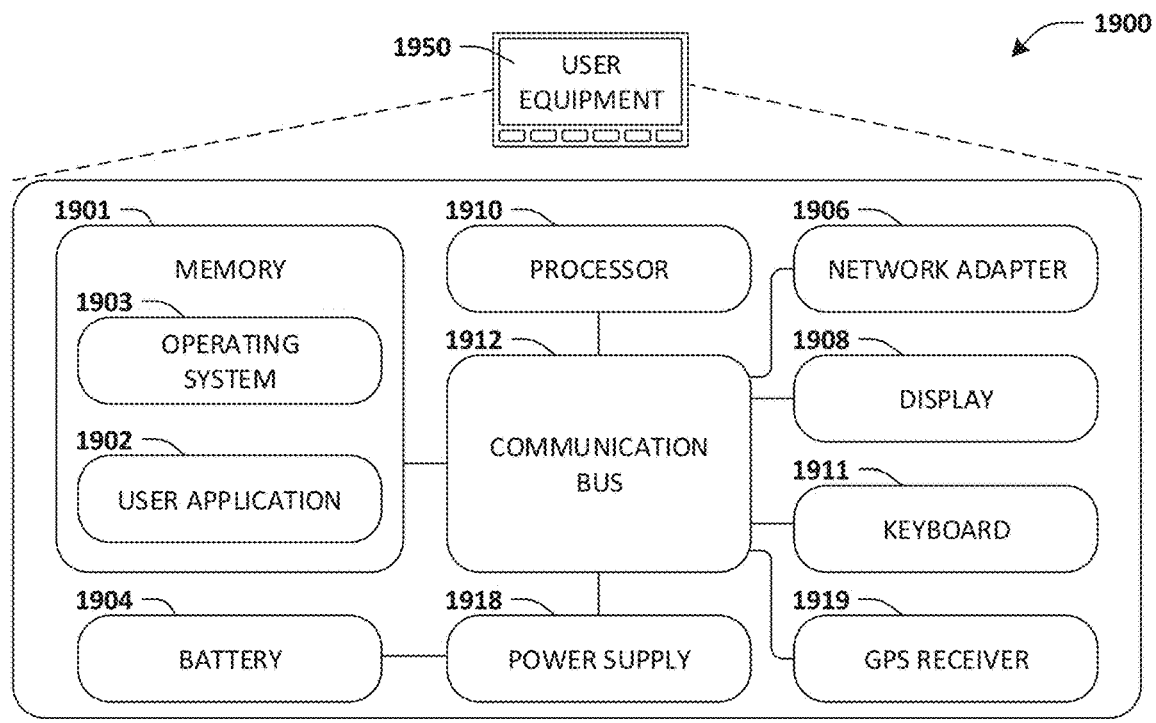
FIG. 19 is an illustration of a scenario involving an example configuration of a user equipment (UE) that may utilize and/or implement at least a portion of the techniques presented herein.

FIG. 19 presents a schematic architecture diagram 1900 of a user equipment (UE) 1950 (e.g., a node) whereupon at least a portion of the techniques presented herein may be implemented. Such a UE 1950 may vary widely in configuration and/or capabilities, in order to provide a variety of functionality to a user. The UE 1950 may be provided in a variety of form factors, such as a mobile phone (e.g., a smartphone); a desktop or tower workstation; an "all-in-one" device integrated with a display 1908; a laptop, tablet, convertible tablet, or palmtop device; a wearable device, such as mountable in a headset, eyeglass, earpiece, and/or wristwatch, and/or integrated with an article of clothing; and/or a component of a piece of furniture, such as a tabletop, and/or of another device, such as a vehicle or residence. The UE 1950 may serve the user in a variety of roles, such as a telephone, a workstation, kiosk, media player, gaming device, and/or appliance.

The UE 1950 may comprise one or more (e.g., hardware) processors 1910 that process instructions. The one or more processors 1910 may optionally include a plurality of cores; one or more coprocessors, such as a mathematics coprocessor or an integrated graphical processing unit (GPU); and/or one or more layers of local cache memory. The UE 1950 may comprise memory 1901 storing various forms of applications, such as an operating system 1903; one or more user applications 1902, such as document applications, media applications, file and/or data access applications, communication applications, such as web browsers and/or email clients, utilities, and/or games; and/or drivers for various peripherals. The UE 1950 may comprise a variety of peripheral components, such as a wired and/or wireless network adapter 1906 connectible to a local area network and/or wide area network; one or more output components, such as a display 1908 coupled with a display adapter (optionally including a graphical processing unit (GPU)), a sound adapter coupled with a speaker, and/or a printer; input devices for receiving input from the user, such as a keyboard 1911, a mouse, a microphone, a camera, and/or a touch-sensitive component of the display 1908; and/or environmental sensors, such as a GPS receiver 1919 that detects the location, velocity, and/or acceleration of the UE 1950, a compass, accelerometer, and/or gyroscope that detects a physical orientation of the UE 1950. Other components that may optionally be included with the UE 1950 (though not shown in the schematic architecture diagram 1900 of FIG. 19) include one or more storage components, such as a hard disk drive, a solid-state storage device (SSD), a flash memory device, and/or a magnetic and/or optical disk reader; a flash memory device that may store a basic input/output system (BIOS) routine that facilitates booting the UE 1950 to a state of readiness; and/or a climate control unit that regulates climate properties, such as temperature, humidity, and airflow, etc.

The UE 1950 may comprise a mainboard featuring one or more communication buses 1912 that interconnect the processor 1910, the memory 1901, and/or various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The UE 1950 may comprise a dedicated and/or shared power supply 1918 that supplies and/or regulates power for other components, and/or a battery 1904 that stores power for use while the UE 1950 is not connected to a power source via the power supply 1918. The UE 1950 may provide power to and/or receive power from other client devices.

Figure 20:
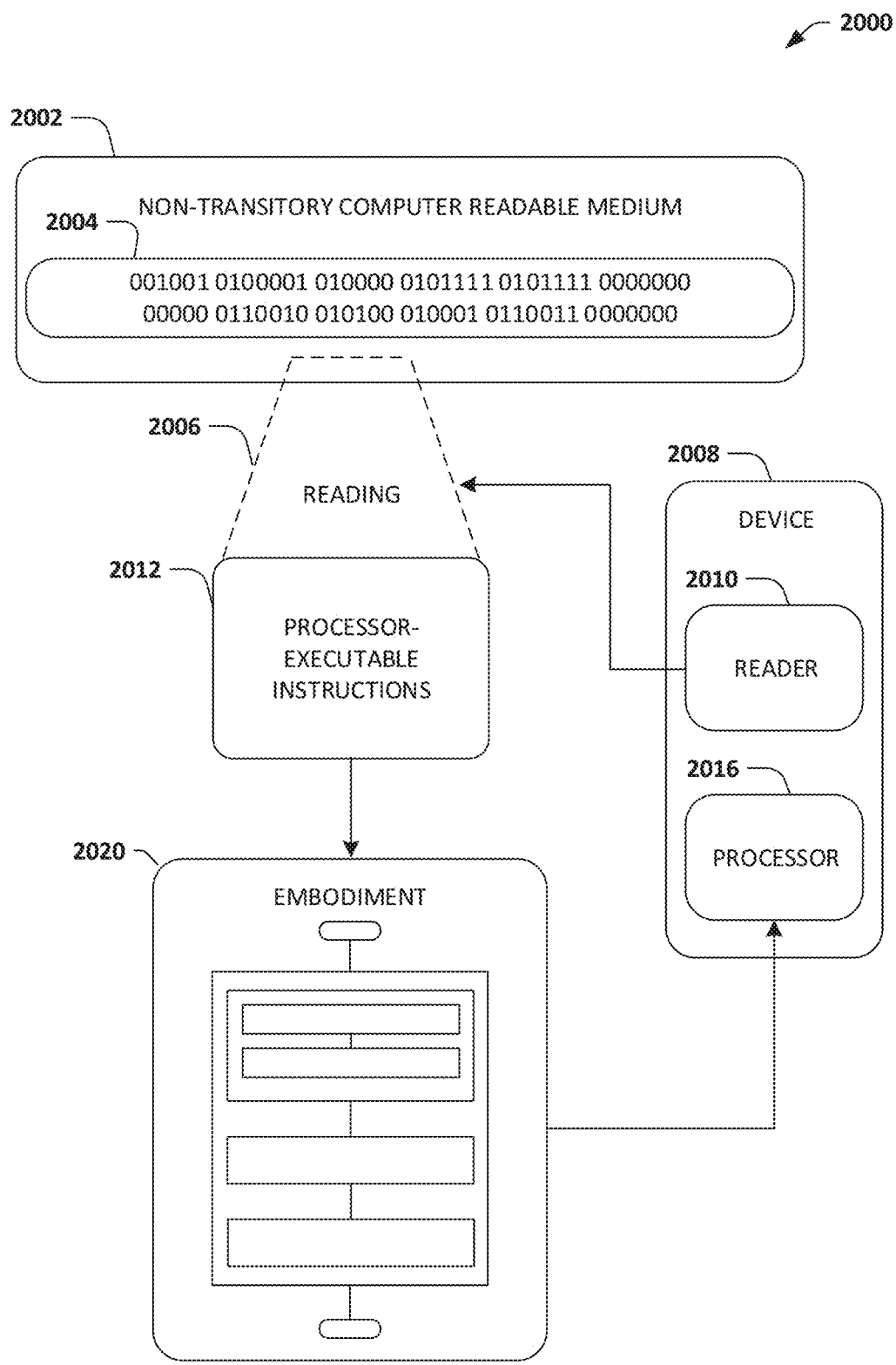
FIG. 20 is an illustration of a scenario featuring an example non-transitory computer readable medium in accordance with one or more of the provisions set forth herein.

FIG. 20 is an illustration of a scenario 2000 involving an example non-transitory computer readable medium 2002. The non-transitory computer readable medium 2002 may comprise processor-executable instructions 2012 that when executed by a processor 2016 cause performance (e.g., by the processor 2016) of at least some of the provisions herein (e.g., embodiment 2020). The non-transitory computer readable medium 2002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drives, a flash memory device, or a magnetic or optical disc (such as a compact disc (CD), digital versatile disc (DVD), and/or floppy disk). The example non-transitory computer readable medium 2002 stores computer-readable data 2004 that, when subjected to reading 2006 by a reader 2010 of a device 2008 (e.g., a read head of a hard disk drive, or a read operation invoked on a solid-state storage device), express the processor-executable instructions 2012. In some embodiments, the processor-executable instructions 2012, when executed, cause performance of operations, such as at least some of the example method 100A of FIG. 1A, the example method 100B of FIG. 1B, the example method 100C of FIG. 1C, the example method 100D of FIG. 1D, for example. In some embodiments, the processor-executable instructions 2012 are configured to cause implementation of a system and/or scenario, such as at least some of the example system 200 of FIG. 2, the example system 300 of FIG. 3, the example system 400 of FIG. 4, the example system 500 of FIG. 5, the example system 600 of FIG. 6, the example system 700 of FIG. 7, the example system 800 of FIG. 8, the example system 900 of FIG. 9, the example system 1000 of FIG. 10, the example system 1100 of FIG. 11, the example system 1200 of FIG. 12, the example system 1300 of FIG. 13, the example system 1400 of FIG. 14, the example system 1500 of FIG. 15, the example system 1600A of FIG. 16A, the example system 1600B of FIG. 16B and/or the chart 1700 of FIG. 17, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers (e.g., nodes(s)).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer (e.g., node) to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   receiving a message from a node;
   determining a configuration based upon the message, wherein the configuration is indicative of: a search space, a start time to monitor the search space, a time interval, and a second time corresponding to a first resource block;
   activating a semi-persistent scheduling resource based upon the configuration;
   monitoring the search space based upon the configuration;
   determining a third time based upon the start time and the time interval; and
   monitoring the search space at the third time.

2. The method of claim 1, wherein the monitoring the search space comprising monitoring the search space at a time, the method comprising:
   receiving or transmitting a second message at the time; and
   deactivating the semi-persistent scheduling resource based upon the second message.

3. The method of claim 1,
   wherein the message received from the node using a physical downlink control channel resource; and
   wherein the search space monitored using the physical downlink control channel resource.

4. The method of claim 1,
wherein the first resource block comprising a first hybrid automatic repeat request semi-persistent scheduling resource.

5. The method of claim 1, further comprising:
transmitting first information, corresponding to the first resource block, to the node;
transmitting second information to the node;
receiving a first acknowledge indication corresponding to the first information, from the node, at a fifth time; and
receiving a second acknowledge indication corresponding to the second information, from the node, at the fifth time.

6. The method of claim 1, further comprising:
transmitting first information, corresponding to the first resource block, to the node;
transmitting second information to the node;
receiving a non-acknowledge indication corresponding to the first information, from the node, at a fifth time; and
receiving an acknowledge indication corresponding to the second information, from the node, at the fifth time.

7. The method of claim 1, further comprising:
transmitting first information to the node;
receiving a non-acknowledge indication, corresponding to the first information, from the node; and
retransmitting the first information, using an uplink semi-persistent scheduling resource, to the node.

8. The method of claim 1, further comprising:
receiving first information from the node;
transmitting a non-acknowledge indication, corresponding to the first information, to the node; and
receiving a retransmission of the first information, using a downlink semi-persistent scheduling resource, from the node.

9. The method of claim 1, further comprising:
receiving a third message from the node; and
deactivating the semi-persistent scheduling resource based upon the third message.

10. A communication device comprising:
a processor; and
a memory comprising processor-executable instructions that when executed by the processor cause performance of a method comprising:
receive a message from a node;
determine a configuration based upon the message, wherein the configuration is indicative of: a search space, a start time to monitor the search space, a time interval, and a second time corresponding to a first resource block;
activate a semi-persistent scheduling resource based upon the configuration;
monitor the search space based upon the configuration;
determine a third time based upon the start time and the time interval; and
monitor the search space at the third time.

11. The communication device of claim 10, wherein the monitoring the search space comprising monitoring the search space at a time, wherein the processor is caused to perform the method that comprises:
receive or transmitting a second message at the time; and
deactivate the semi-persistent scheduling resource based upon the second message.

12. The communication device of claim 10,
wherein the message received from the node using a physical downlink control channel resource; and
wherein the search space monitored using the physical downlink control channel resource.

13. The communication device of claim 10,
wherein the first resource block comprising a first hybrid automatic repeat request semi-persistent scheduling resource.

14. The communication device of claim 10, wherein the processor is caused to perform the method that further comprises:
transmit first information, corresponding to the first resource block, to the node;
transmit second information to the node;
receive a first acknowledge indication corresponding to the first information, from the node, at a fifth time; and
receive a second acknowledge indication corresponding to the second information, from the node, at the fifth time.

15. The communication device of claim 10, wherein the processor is caused to perform the method that further comprises:
transmit first information, corresponding to the first resource block, to the node;
transmit second information to the node;
receive a non-acknowledge indication corresponding to the first information, from the node, at a fifth time; and
receive an acknowledge indication corresponding to the second information, from the node, at the fifth time.

16. The communication device of claim 10, wherein the processor is caused to perform the method that further comprises:
transmit first information to the node;
receive a non-acknowledge indication, corresponding to the first information, from the node; and
retransmit the first information, using an uplink semi-persistent scheduling resource, to the node.

17. The communication device of claim 10, wherein the processor is caused to perform the method that further comprises:
receive first information from the node;
transmit a non-acknowledge indication, corresponding to the first information, to the node; and
receive a retransmission of the first information, using a downlink semi-persistent scheduling resource, from the node.

18. The communication device of claim 10, wherein the processor is caused to perform the method that further comprises:
receive a third message from the node; and
deactivate the semi-persistent scheduling resource based upon the third message.

19. A non-transitory computer readable medium comprising processor-executable instructions that when executed by a processor cause the processor to perform a method, comprising:
receiving a message from a node;
determining a configuration based upon the message, wherein the configuration is indicative of: a search space, a start time to monitor the search space, a time interval, and a second time corresponding to a first resource block;
activating a semi-persistent scheduling resource based upon the configuration;
monitoring the search space based upon the configuration;
determining a third time based upon the start time and the time interval; and
monitoring the search space at the third time.

20. The non-transitory computer readable medium of claim 19, wherein the method further comprises:
   transmitting first information to the node;
   receiving a non-acknowledge indication, corresponding to the first information, from the node; and
   retransmitting the first information, using an uplink semi-persistent scheduling resource, to the node.

* * * * *